(12) United States Patent
Sawant et al.

(10) Patent No.: US 11,414,357 B2
(45) Date of Patent: Aug. 16, 2022

(54) CROP NUTRITION AND FORTIFICATION COMPOSITION

(71) Applicants: Arun Vitthal Sawant, Thane (IN); Thankapan Vadakekuttu, Navi Mumbai (IN)

(72) Inventors: Arun Vitthal Sawant, Thane (IN); Thankapan Vadakekuttu, Navi Mumbai (IN)

(*) Notice: Subject to any disclaimer, the term of this patent is extended or adjusted under 35 U.S.C. 154(b) by 12 days.

(21) Appl. No.: 17/054,142

(22) PCT Filed: May 8, 2019

(86) PCT No.: PCT/IB2019/053775
§ 371 (c)(1),
(2) Date: Nov. 9, 2020

(87) PCT Pub. No.: WO2019/215631
PCT Pub. Date: Nov. 14, 2019

(65) Prior Publication Data
US 2021/0253488 A1 Aug. 19, 2021

(30) Foreign Application Priority Data

May 10, 2018 (WO) .................. PCT/IB2018/053251
Nov. 6, 2018 (IN) .............................. 201821042026

(51) Int. Cl.
*C05D 9/00* (2006.01)
*C05D 9/02* (2006.01)
(Continued)

(52) U.S. Cl.
CPC ................ *C05B 17/00* (2013.01); *C05D 3/00* (2013.01); *C05D 9/00* (2013.01); *C05D 9/02* (2013.01);
(Continued)

(58) Field of Classification Search
None
See application file for complete search history.

(56) References Cited

U.S. PATENT DOCUMENTS

| 5,112,379 A * | 5/1992 | Young ................... C05G 5/40 71/31 |
| 6,749,659 B1 * | 6/2004 | Yu ........................ C05D 1/005 71/28 |

(Continued)

FOREIGN PATENT DOCUMENTS

| GB | 2513232 A | 10/2014 |
| WO | 2008084495 A1 | 7/2008 |

(Continued)

OTHER PUBLICATIONS

International Search Report from PCT/IB2019/053775 dated Aug. 21, 2019.

(Continued)

*Primary Examiner* — Wayne A Langel
(74) *Attorney, Agent, or Firm* — Melissa M. Hayworth; E. Joseph Gess

(57) ABSTRACT

The invention relates to a water dispersible granular composition comprising of 0.1% to 70% by weight of boron salts, complexes, derivatives or mixtures thereof, 1% to 90% by weight of elemental sulphur and 1% to 30% by weight of dispersing agent, with granules in a size range of 0.1-2.5 mm and particles in the range of 0.1-20 microns. The invention further relates to liquid suspension composition comprising 0.1% to 55% by weight of boron salts, complexes, derivatives or mixtures thereof, 1% to 65% by weight of elemental sulphur, at least one structuring agent and at least one surfactant, where the composition has particle size range of 0.1-20 microns. The invention further relates to a process of preparing the crop nutrition and fortification composition (Continued)

and to a method of treating the plants, seeds, crops, plant propagation material, locus, parts thereof or the soil with the composition.

27 Claims, 2 Drawing Sheets

(51) Int. Cl.
  *C05B 17/00* (2006.01)
  *C05G 5/12* (2020.01)
  *C05G 3/40* (2020.01)
  *C05G 5/10* (2020.01)
  *C05G 5/27* (2020.01)
  *C05D 3/00* (2006.01)

(52) U.S. Cl.
  CPC .............. *C05G 3/40* (2020.02); *C05G 5/10* (2020.02); *C05G 5/12* (2020.02); *C05G 5/27* (2020.02)

(56) References Cited

U.S. PATENT DOCUMENTS

| | | |
|---|---|---|
| 8,241,387 B2 | 8/2012 | Shah |
| 8,801,827 B2 | 8/2014 | Taylor et al. |
| 9,409,827 B2* | 8/2016 | Taylor ................. C05D 5/00 |
| 10,492,489 B2 | 12/2019 | Vadakekuttu et al. |
| 2012/0114949 A1 | 5/2012 | Lin et al. |
| 2012/0122681 A1 | 5/2012 | Le Vezouet et al. |
| 2016/0185678 A1* | 6/2016 | Sanders ................. C05G 3/80 71/28 |
| 2016/0207844 A1* | 7/2016 | Stoller ................. C05D 5/00 |
| 2016/0229761 A1* | 8/2016 | Cherry ................. C05D 9/00 |
| 2017/0283334 A1* | 10/2017 | Rohrer ................. C05D 9/02 |
| 2017/0327430 A1* | 11/2017 | Allais ................. C05G 5/27 |
| 2018/0029945 A1 | 2/2018 | Valencia |
| 2018/0339951 A1* | 11/2018 | McLaughlin ........... C05G 5/30 |
| 2019/0023623 A1* | 1/2019 | Feldman ................. C05B 9/00 |

FOREIGN PATENT DOCUMENTS

| | | |
|---|---|---|
| WO | 2009125435 A2 | 10/2009 |
| WO | 2012131702 A1 | 10/2012 |
| WO | 2016113665 A1 | 7/2016 |
| WO | 2016183685 A1 | 11/2016 |

OTHER PUBLICATIONS

International Search Report from PCT/IB2018/053251 dated Aug. 17, 2018.

* cited by examiner

CROP NUTRITION AND FORTIFICATION COMPOSITION

RELATED APPLICATIONS

The present application is a U.S. National Stage filing under 35 U.S.C. § 371 of PCT/IB2019/053775 filed 8 May 2019, which claims priority to Indian Application No. 201821042026 filed 6 Nov. 2018 and to PCT/IB2018/053251 filed 10 May 2018, the contents of all of which are incorporated herein by reference in their entireties.

1. FIELD OF THE INVENTION

The invention relates to a crop nutrition and fortification composition comprising effective amount of one or more of boron salts, complexes, derivatives or mixtures thereof, elemental sulphur and at least one agrochemically acceptable excipient. The composition has a particle size in the range of about 0.1 micron to 20 microns. More particularly, the invention relates to a crop nutrition and fortification in the form of water dispersible granules comprising one or more of boron salts, complexes, derivatives or mixtures thereof, elemental sulphur and at least one dispersing agent, wherein the water dispersible granular composition has a particle size in the range of 0.1 micron to 20 microns. Further, the invention relates to a crop nutrition and fortification composition in the form of a liquid suspension including effective amount of one or more of boron salts, complexes, derivatives or mixtures thereof; elemental sulphur, at least one structuring agent and at least one agrochemically acceptable excipient, where the liquid suspension composition has a particle size in the range of about 0.1-20 microns. Furthermore, the invention relates to a process of preparing the crop nutrition and fortification composition in the form of water dispersible granules and liquid suspension and to a method of treating the plants, seeds, crops, plant propagation material, locus, parts thereof or the soil with the crop nutrition and fortification composition.

2. BACKGROUND OF THE INVENTION

In describing the embodiments of the invention, specific terminology is chosen for the sake of clarity. However, it is not intended that the invention be limited to the specific terms so selected and it is to be understood that each specific term includes all technical equivalents that operate in a similar manner to accomplish a similar purpose.

It is observed that intensive agriculture and adoption of high yielding varieties of crops are essential to meet the food requirements of increasing human population. Boron deficiency in plant and soil is one of the limiting factor in increasing the crop productivity and quality. Boron (B) is an essential micronutrient required for various physiological process for plant growth, development and reproduction, however, in relatively small amounts, thus making it a micronutrient. Further, boron plays an important role in cell wall formation and stability, the movement and metabolism of sugars or energy in the plant, or the growing parts of plants, and pollination and seed set and synthesis of plant hormones and nucleic acids. Boron is one of the most important micronutrient affecting membrane stability as it supports the structural and functional integrity of plant cell membranes. It also functions in lignin formation of cell walls. The primary function of boron is to provide structural integrity to the cell wall in plants. Other functions include maintenance of the plasma membrane and other metabolic pathways. Adequate boron is also required for effective nitrogen fixation and nodulation in legume crops. Beside this boron also plays key roles in cell wall structure, carbohydrate metabolism, RNA metabolism, respiration, indole acetic acid (IAA) metabolism, phenolic metabolism and ascorbate metabolism Plants take up boron in its oxidized forms, H3BO3 (boric acid) and H2BO3-(borate).

Most crops are not able to mobilize boron from vegetative tissues to actively growing, meristematic plant tissues such as shoots, root tips, flowers, seeds or fruits. Rather, boron transport occurs primarily in the xylem channel, resulting from transpiration. Because of this, deficiency symptoms first develop in newly developed plant tissue such as young leaves, shoots and reproductive structures.

Boron deficiency in plants affects vegetative and reproductive growth of plants, resulting in inhibition of cell expansion, death of meristem, and reduced fertility. Under severe boron deficiency, stunted development and death of meristematic growing points are common. Boron deficiency leads to noticeable physiological disorders in plants like black necrosis of young leaves and terminal buds, rigid and brittle stems, increased lateral branches and necrosis in fruits. Other common reactions include reduced root elongation, failure of flowers to set seeds and fruit abortion. Low boron supply may also adversely affect pollination and seed set, without visible leaf deficiency symptoms. Moreover, poor boron nutrition can also result in large losses in crop production, crop quality and growth. However, it is also observed that high amount of boron in the soil and plants would cause boron toxicity resulting in poor plant growth, development and may cause yield loses. Hence there is need to provide boron in adequate proportions to the crops or the soil so as to avoid toxicity caused by boron salts.

It is observed that managing the boron nutrition of crops is difficult due to factors such as inadequate availability of boron to plant or depletion of boron content in soil such as to soil erosion, increased adoption of intensive agriculture and high yielding crop varieties, low organic matter in the soil, poor soil fertility, imbalance fertilizer use in soil, soil type, soil nutrient interaction, soil pH, carbonate levels in the soil, salinity, soil moisture, soil alkalinity, low temperature, and concentration of other nutrient elements and their interactions (e.g. competitive microelements such as nitrogen and potassium may also affect the boron availability and at times leads to boron deficiency.

Also the ability of the plants to respond to boron availability ultimately affects human nutrition, both in terms of crop yield and boron concentration in edible plant tissues. Therefore proper boron nutrition is critical for optimizing the crop nutrition and metabolism, which in turn contributes to the crop yield and quality.

Various fertilizers with either straight boron fertilizer or boron fortified fertilizer with other nutrient elements, are available in the market to meet the boron requirement of the plants.

It is observed that known boron fertilizers do not provide for efficient use of the nutrients leading to reduced availability or uptake of boron by the plants. Consequently, large quantity of boron fertilizers are needed to be applied, to meet small boron requirement of plants. Such fertilizers lead to inadequate supply of boron to the plant, are more prone to leaching loses and exhibit negative interactions with other nutrient elements thus inhibiting the availability of required nutrients to the plant and also cause toxicity to the plant if not used in optimized dosages.

It is observed that known boron based compositions in the form of pellets, pastilles, etc. have a larger size distribution, resulting in their poorer suspensibility, uneven distribution in the soil and uneven coverage on the crop. Further, these conventional fertilizers are available in forms, which are not completely soluble or do not disperse adequately. This presents a great challenge to the user and the environment. As these compositions are not completely soluble, they leave behind a residue. Such commercially available boron based compositions also tend to either settle or sediment at the bottom of the packaging or the container from which it is to be applied, thereby failing to exhibit desired results, spreadability, tend to clog the nozzles and pose problems in application by drip irrigation or sprinkler irrigation, which are now the most practiced modes of irrigation considering increased labour shortage, and lack uniform distribution of the components to the crops for right uptake.

Also the role of sulphur as an essential and a growing nutrient and fertilizer has been long known. The most cost effective approach to introduce sulphur to soil is to use sulphur as elemental sulphur as it is 100% Sulphur. Teachings in the art would motivate a skilled person to prepare compositions with larger particle size as milling of elemental sulphur may pose explosion or fire hazards and thus incorporating elemental sulphur at reduced particle size in the composition remains a greater challenge. Conventionally, sulphur based compositions known in the art have larger particle size such as bentonite granules, sulphur pellets, sulphur granules, molten sulphur.

There is a need to make agricultural fertilizers composition more efficient inhibiting conversion to forms that are less stable in the soil, or enhancing availability of nutrients to plants. Efficiency of boron fertilizer compositions has to be increased to enhance the uptake of boron by the plants.

Agricultural compositions which include fertilizer and micronutrients are known in the art. Such compositions mostly talk about milling or crushing of only the insoluble micronutrients, so as to form a fine powder or dust. However, milling of only insoluble micronutrients and mixing other fertilizers, micronutrients and excipients later would lead to non-uniform blend of actives in the formulation which may not be desirable in terms of its application and also poor uptake of the nutrients by the plants.

Furthermore, developing compositions which include sulphur and boron in combination has been associated with serious difficulties. For example, when borate compounds are added as a boron source to molten elemental sulfur, foaming of the mixture occurs, rendering the production of the fertilizer composition difficult. Further, pastilles or pellets of micronutrients such as boron and sulphur include swelling clays whereby the pellets or pastilles swell on coming in contact with moisture and thereby disintegrate to release the actives. Such pellets or pastilles lead to irregular release of the micronutrients resulting in poorer field efficacy in crops. Again such pastille compositions are only suitable for broadcast applications, owing to disadvantages namely, poor dispersion and suspensibility in water because of its larger size resulting in nozzle clogging in spray applications, posing a problem in delivery of nutrients to the plant or the crop. On other hand, powder formulations are very difficult to broadcast and can cause big risk to human health due to dusting and engulfing of dust particle into human body due to inhalation, by the end user. Due to these drawbacks, such prior art pastille compositions containing boron and sulphur have no commercially feasibility and zero applicability in drip or sprinkler irrigation systems which are also becoming more essential as labour shortage increases and water becomes a scarce resource.

Furthermore, the other formulations disclosed in the art would direct a person to arrive at viscous liquids which are highly concentrated, resulting in issues in practical application. These highly concentrated formulations are difficult to be diluted in water. Such highly concentrated formulations do not form stable dispersions and tend to form a hard pack, thus rendering such compositions unsuitable for use. Such viscous, large particle size formulations being unpourable tend to clog the nozzles and pose a problem in the delivery of nutrients to the plant or the crop.

Thus no suitable compositions comprising boron in combination with fertilizer such as sulphur are known or available, which can be effectively used as a nutrient to meet the requirements of the plants or increased nutrient use efficiency or enhanced nutrient uptake and address the drawbacks discussed above with known compositions.

It was noted by the present inventors that the composition of the present invention upon application or use, disperses almost immediately in the water and soil, thereby facilitating its availability to the plant surface, from where it has to be up taken by plant by root interception or surface coverage. It was found that the present composition is synergistic in nature and when formulated at a specific particle size, made both sulphur and boron readily available for uptake by the plants and increase the overall plant heath and yield. Further, it was observed that the selection of specific type of boron salts in combination with elemental sulphur prevents leaching of boron and makes it available to the fullest for the uptake by crops. This helps in reducing chlorosis in younger growing leaves, improves chlorophyll content, disease resistance, and boron uptake which results in a nutritionally rich crop.

Furthermore, the inventors of the present invention found that the application of boron along with sulphur in the form of the present composition improves the nutrient use efficiency of both sulphur and boron by plant i.e. plant takes up higher amount of sulphur and boron from lesser quantities of fertilizer applied in the soil. Moreover, the inventors of the present application have determined that the crop nutrition or fortification compositions of the present invention including effective amounts of one or more boron salts, complexes, derivatives or mixtures thereof; and elemental sulphur and at least one agrochemically acceptable excipient; with a particle size in the range of from 0.1-20 microns demonstrate excellent field efficacy. This novel composition improved plant health and development, boron and other nutrient uptake, pollinations, cell integrity and other plant physiological parameters such as increased rooting, improved foliage, and disease resistance, increased greenness of the crops providing a nutritionally rich and fortified crop, resulting in improved crop productivity and yield. The composition can be in the form of water dispersible granules and liquid suspension composition. The composition of the present invention also exhibits superior physical characteristics such as suspensibility, dispersibility, flowability, wettabilty and improved viscosity resulting in better pourability. The compositions of the present invention also demonstrated superior performance under accelerated storage conditions and also effective usage in drip irrigation. Moreover, the composition exhibits a surprisingly higher field efficacy at reduced dosages of application of the composition.

3. SUMMARY OF THE INVENTION

The inventors have determined that a water dispersible granular crop nutrition and fortification composition comprising effective amounts of one or more of boron salts, complexes, derivatives or mixtures thereof, elemental sulphur and at least one dispersing agent, provides a higher yield in various crops and improves plant physiological parameters. The water dispersible granules include one or more of boron salts, complexes, derivatives or mixtures thereof in a concentration range of 0.1% to 70% by weight of the total composition and elemental sulphur in a concentration range of 1% to 90% by weight of the total composition and at least one dispersing agent. The dispersing agents are present in a concentration range of 1% to 30% by weight of the composition. The water dispersible granular composition for crop nutrition and fortification further includes agrochemically acceptable excipients in the range of 1%-98% by weight of total composition. Further, the water dispersible granular crop nutrition and fortification composition is in the size range 0.1 mm-2.5 mm and comprises particles in the size range of 0.1 micron to 20 microns. The water dispersible granules disperse into particles in the size range of 0.1 micron to 20 microns. According to an embodiment, the boron salts comprised in the water dispersible granular composition include water soluble salts or water insoluble salts.

Furthermore, the inventors of the application have also surprisingly found that a crop nutrition and fortification composition in the form of a liquid suspension comprises one or more of boron salts, complexes, derivatives or mixtures thereof; elemental sulphur; and at least one agrochemically acceptable excipient and at least one structuring agent, demonstrated a high yield in certain crops and also finds a direct use in the micro irrigation systems.

According to an embodiment, the liquid suspension composition includes boron salts, complexes, derivatives or mixtures thereof in a concentration range of 0.1% to 55% by weight of the total composition. The liquid suspension composition includes elemental sulphur in the concentration range of 1% to 65% by weight of the total composition. The agrochemical excipients are present in a concentration range of 1% to 98.99% by weight of the composition. The liquid suspension composition includes agrochemically acceptable excipients such as surfactants. The surfactants are present in a concentration range of 0.1% to 60% by weight of the total composition. The composition includes structuring agents in a concentration range of 0.01% to 5% by weight of the total composition. The liquid suspension composition comprises particles in the size range of 0.1 micron to 20 microns. According to an embodiment, the boron salts comprised in the liquid suspension include water soluble salts or water insoluble salts.

Furthermore, the invention relates to a process of preparing the crop nutrition and fortification composition comprising effective amounts of one or more of boron salts, complexes, derivatives or mixtures thereof, elemental sulphur and at least one agrochemically acceptable excipient in the form of water dispersible granules and liquid suspension composition, where the compositions have a particle size in the range of 0.1 micron to 20 microns.

The invention also relates to a method of treating the plants, seeds, crops, plant propagation material, locus, parts thereof or the soil with the crop nutrition and fortification composition comprising effective amount of one or more of boron salts, complexes, derivatives or mixtures thereof, elemental sulphur and at least one agrochemically acceptable excipient.

The crop nutrition and fortification composition can be applied as a foliar spray or to the soil, through broadcasting or bend/side placement, drenching, drilling or through micro irrigation such as through drip or trickle irrigation. The latter case of drip or trickle irrigation further optimizes farming practices, which are greatly challenged by an ever-increasing labour and water shortage. Thus, the compositions of the invention can be used in all possible ways of application under different agronomical methods of crop cultivations, as per the convenience of the user.

According to an embodiment, the invention further relates to a method of improving the soil fertility, plant health, improving the plant nutrition, fortifying or strengthening the plant, protecting the plant, enhancing the plant yield or conditioning the soil; the method comprising treating at least one of seeds, seedling, crops, a plant, plant propagation material, locus, parts thereof or to the surrounding soil with the crop nutrition and fortification composition comprising effective amounts of one or more of boron, complexes, derivatives or mixtures thereof, elemental sulphur and at least one agrochemically acceptable excipient.

It is observed that the crop nutrition and fortification composition exhibited good physical and chemical properties, is readily dispersible, has enhanced suspensibility, is non-viscous, readily pourable, does not form a hard cake and exhibits enhanced stability even at extended storage under higher temperatures which in turn results in superior field performance.

4. DESCRIPTION OF THE DRAWINGS

For a more complete understanding of the invention, reference should now be made to the embodiments illustrated in greater detail in the accompanying drawings and described by way of embodiments of the invention.

FIG. 2 is a graphical representation to demonstrate the impact of 50% Sulphur+25% Calcium borate in different forms such as water dispersible granules, pastilles and liquid suspension, on the availability of boron to the soil.

5. DESCRIPTION OF THE INVENTION

Figure 1:
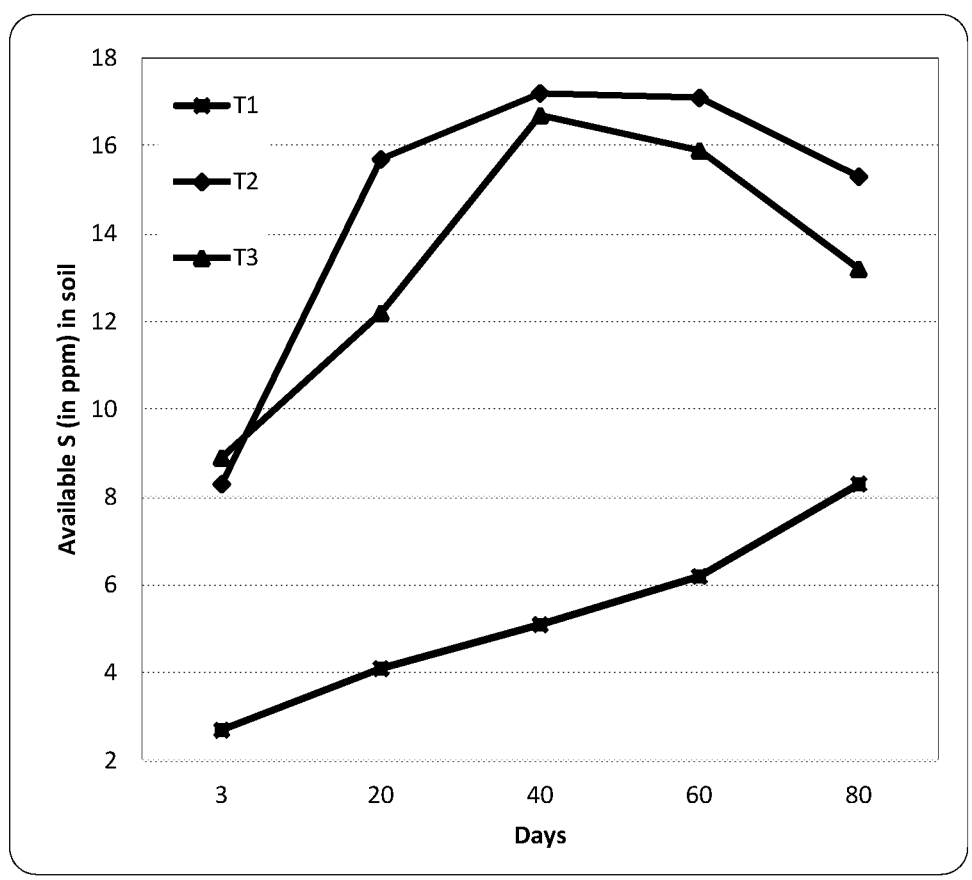
FIG. 1 is a graphical representation to demonstrate the impact of 50% Sulphur+25% Calcium borate in different forms such as water dispersible granules, pastilles and liquid suspension, on the availability of sulphur to the soil.
Figure 1:
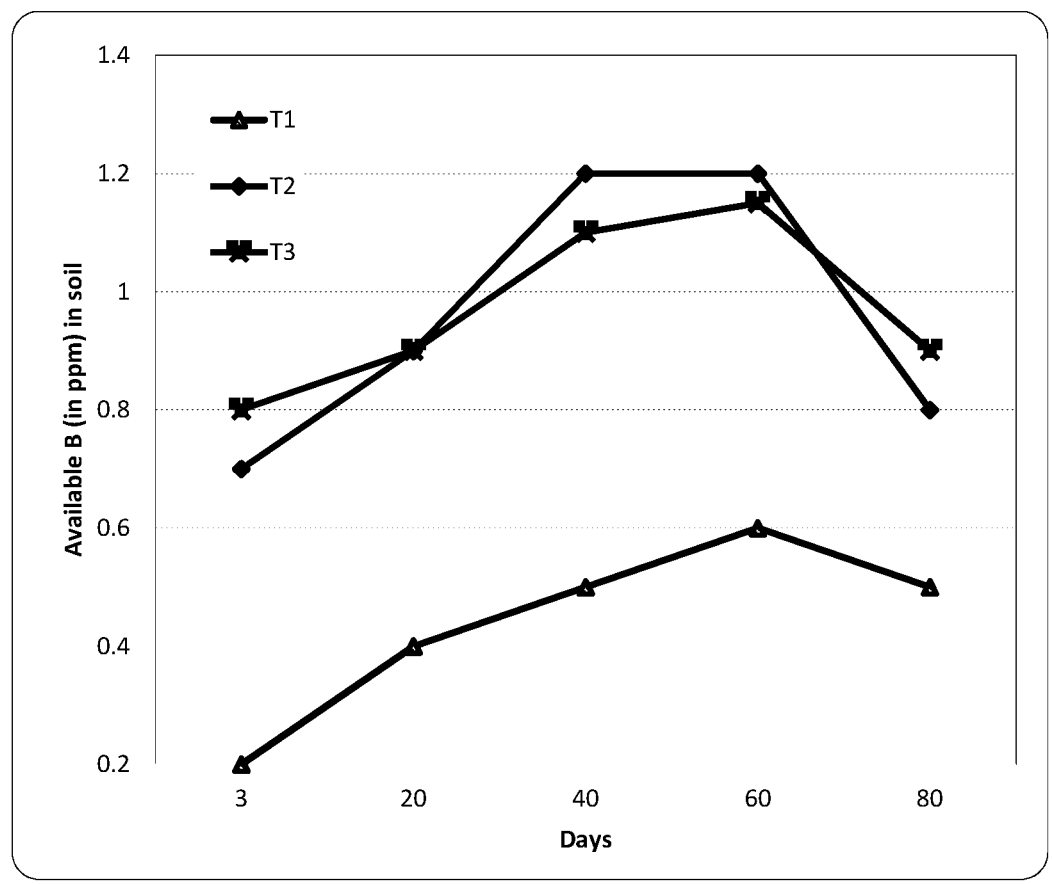

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose. It is understood that any numerical range recited herein is intended to include all subranges subsumed. Also, unless denoted otherwise, percentage of components in a composition are presented as weight percent.

Water dispersible granules can be defined as a formulation consisting of granules to be applied after dispersion and suspension in water. As described herein, "WG" or "WDG" refer to water dispersible granules According to the invention, the term "liquid suspension" is defined as a stable suspension of a composition in a fluid such as water or a water miscible solvent usually intended for dilution with water before use. Further the term or the phrase "liquid suspension" also encompasses "aqueous dispersion" or "aqueous suspensions" or "suspension concentrate" or an SC composition or a "suspo-emulsion" composition.

Nutrient use efficiency (NUE) is defined as a measure of how well plants use the available mineral nutrients.

Improvement of NUE is an essential pre-requisite for expansion of crop production into marginal lands with low nutrient availability but also a way to reduce use of inorganic fertilizer.

The invention relates to a composition for crop nutrition or fortification which includes effective amounts of one or more of boron salts, complexes, derivatives or mixtures thereof; elemental sulphur and at least one agrochemically acceptable excipient, whereby the composition exhibits improved dispersibility and suspensibility. The boron salts, complexes, derivatives or mixtures thereof are present in a concentration range of 0.1% to 70% w/w and elemental sulphur is present in a concentration range of 1% to 90% w/w. The composition has a particle size in the range of 0.1 micron to 20 microns, whereby the composition exhibits improved dispersibility and suspensibility.

According to an embodiment, the boron salts, complexes, derivatives thereof include water soluble and/or water insoluble boron salts or complexes or derivatives or mixtures thereof.

According to an embodiment, the boron salts, complexes or derivatives thereof, particularly, include one or more water insoluble salts. According to an embodiment, the water insoluble salts include, but are not limited to, one or more of calcium borate or gertsley borate; zinc borate; magnesium borate or boracite; colemanite; aluminium borate; boron phosphate; boron trioxide or diboron trioxide; elemental boron, boron nitride, boron nitrite, boron carbide; aluminum dodecaboride and their complexes, derivatives or mixtures thereof. According to an embodiment, the calcium borate includes calcium tetraborate or vitrabor. However, those skilled in the art will appreciate that it is possible to use other water insoluble boron salts without departing from the scope of the present invention.

According to an embodiment, the preferred water insoluble boron salts include, but not limited to, one or more of calcium borates, magnesium borate, zinc borate, boron phosphate, boron trioxide or diboron trioxide and their complexes, derivatives or mixtures thereof. However, those skilled in the art will appreciate that it is possible to use other water insoluble boron salts without departing from the scope of the present invention.

According to an embodiment, the boron salts include one or more of water soluble salts. According to an embodiment, the water soluble salts include diborates, triborates, tetraborates and hexaborides. According to an embodiment, one or more of boric acid or orthoboric acid or boracic acid or acidum boricum; borax or sodium borate or sodium tetraborate or sodium borosilicate; or sodium tetraborate decahydrate or disodium tetraborate; disodium tetraborate octahydrate; potassium tetraborate; boron trichloride or Boron (III) chloride or Trichloroborane; boron triiodide or triiodoborane; sodium tetraborate decahydrate; boron sesquioxide or boric acid anhydride; sodium perborate; disodium octaborate tetrahydrate or Aquabor/Boron sodium oxide or Sodium octaborate or Tim-bor insecticide or Polybor; Borax pentahydrate or Bor48 or 5 Mol Borax; boron oxide which includes boron suboxide or boron monoxide; boron hydroxide, Sodium-Calcium Borates, Boron trifluoride, Boron Tribromide; boric oxide; disodium octaborate, sodium borohydride or sodium tetrahydridoborate or sodium tetrahydroborate; calcium borogluconate; sodium cyanoborohydride; sodium pentaborate; ammonium pentaborate, sodium triacetoxyborohydride or sodium triacetoxyhydroborate; sodium triethylborohydride; their complexes; derivatives or mixtures thereof. However, those skilled in the art will appreciate that it is possible to use other water soluble boron salts without departing from the scope of the present invention.

According to an embodiment, the preferred water soluble boron salts include one or more of boric acid, borax or sodium borate or sodium tetraborate or sodium tetraborate decahydrate, sodium tetraborate pentahydrate, sodium borosilicate; disodium octaborate tetrahydrate; and their complexes, derivatives or mixtures thereof. However, those skilled in the art will appreciate that it is possible to use other water soluble boron salts without departing from the scope of the present invention.

According to an embodiment, preferably the boron salts include boric acid; calcium borate; zinc borate; magnesium borate; boron trioxide; borax or sodium borate or sodium tetraborate or sodium tetraborate decahydrate or sodium tetraborate pentahydrate; boron oxide; disodium octaborate tetrahydrate and their complexes, derivatives or mixtures thereof.

According to an embodiment, the boron salts, complexes, derivatives or mixtures thereof are present in the concentration range of 0.1% to 70% by weight of the total composition. According to an embodiment, the boron salts, complexes, derivatives or mixtures thereof are present in the concentration range of 0.1% to 55% by weight of the total composition. According to an embodiment, the boron salts, complexes, derivatives or mixtures thereof are present in the concentration range of 0.1% to 45% by weight of the total composition. According to an embodiment, boron salts, complexes, derivatives or a mixture thereof are present in the concentration range of 0.1% to 25% by weight of the total composition. According to an embodiment, the boron salts, complexes, derivatives or a mixture thereof are present in the concentration range of 0.1% to 10% by weight of the total composition.

According to an embodiment, the elemental sulphur is present in an amount of 1% to 90% by weight of the crop nutrition and fortification composition. According to an embodiment, elemental sulphur is present in an amount of 1% to 80% by weight of the crop nutrition and fortification composition. According to an embodiment, elemental sulphur is present in an amount of 1% to 65% by weight of the crop nutrition and fortification composition. According to an embodiment, elemental sulphur is present in an amount of 1% to 50% by weight of the crop nutrition and fortification composition.

According to an embodiment, elemental sulphur is present in an amount of 1% to 40% by weight of the crop nutrition and fortification composition.

According to an embodiment, the elemental sulphur is present in an amount of 20% to 90% by weight of the crop nutrition and fortification composition.

According to an embodiment, the elemental sulphur is present in an amount of 20% to 40% by weight of the crop nutrition and fortification composition.

According to an embodiment, the particle size of the crop nutrition and fortification composition is in the range of 0.1 micron to 20 microns. According to another embodiment, the particle size of the crop nutrition and fortification composition is in the range of 0.1 micron to 15 microns. According to an embodiment, the particle size of the crop nutrition and fortification composition is in the range of 0.1 micron to 10 microns.

According to an embodiment, the weight ratio of one or more of boron salts, complexes, derivatives or mixtures to elemental sulphur is 1:900 to 70:1. According to an embodiment, the weight ratio of one or more of boron salts, complexes, derivatives or mixtures to elemental sulphur is 1:90 to 70:1.

According to an embodiment, the weight ratio of one or more of boron salts, complexes, derivatives or mixtures to elemental sulphur is 1:90 to 3.5:1. According to an embodiment, the weight ratio of one or more of boron salts, complexes, derivatives or mixtures to elemental sulphur is 1:90 to 5:4.

According to an embodiment, the crop nutrition and fortification composition is in a solid form or a liquid form, for e.g., the crop nutrition and fortification composition is in the form of wettable powders, aqueous suspensions, suspoemulsions, water dispersible granules, seed dressings or seed treatment compositions, and combinations thereof.

According to an embodiment, the crop nutrition and fortification composition is in the form of water dispersible granules. According to an embodiment, the composition in the form of water dispersible granules particularly includes one or more of boron salts, complexes, derivatives or mixtures thereof in the range of 0.1% to 70% by weight of the total composition, elemental sulphur in the range of 1% to 90% by weight of the total composition and at least one dispersing agent in a concentration range of 1% to 30% by weight of the total composition. The water dispersible granules are in a size range of 0.1 mm to 2.5 mm and the composition has a particle size in the range of 0.1 micron to 20 microns.

According to an embodiment, the crop nutrition and fortification composition in the form of water dispersible granules comprises one or more of water soluble boron salts or water insoluble boron salts.

According to an embodiment, the crop nutrition and fortification composition in the form of water dispersible granules particularly includes one or more of water insoluble boron salts, complexes or derivatives thereof in the range of 0.1% to 70% by weight of the total composition, elemental sulphur in the range of 1% to 90% by weight of the total composition and at least one dispersing agent in the range of 1% to 30% by weight of the total composition. The water dispersible granules are in the size range of 0.1 mm to 2.5 mm and includes particles in the size range of 0.1 micron to 20 microns.

According to an embodiment, the crop nutrition and fortification composition in the form of water dispersible granules particularly comprises 0.1% to 70% by weight of one or more of boron trioxide or diboron trioxide; calcium borate or gertsley borate; zinc borate; magnesium borate; aluminium borate; boron phosphate; and their complexes, derivatives or mixtures thereof; elemental sulphur in the range of 0.1% to 90% by weight of the total composition and at least one dispersing agent in the range of 1% to 30% by weight of the total composition. The water dispersible granules are in the size range of 0.1 mm to 2.5 mm and includes particles in the size range of 0.1 micron to 20 microns.

According to an embodiment, the crop nutrition and fortification composition in the form of water dispersible granules comprise 0.1% to 70% by weight of one or more of water soluble boron salts, complexes or derivatives thereof, elemental sulphur in the range of 0.1% to 90% by weight of the total composition and at least one agrochemical excipient, wherein the composition includes granules in the size range of 0.1 mm to 2.5 mm and comprises particles in the size range of 0.1 micron to 20 microns.

According to an embodiment, the crop nutrition and fortification composition in the form of water dispersible granules comprise 0.1% to 70% by weight of one or more of boric acid or orthoboric acid or boracic acid or acidum boricum; borax or sodium borate or sodium tetraborate or sodium tetraborate decahydrate or sodium tetraborate pentahydrate or disodium tetraborate; potassium tetraborate; boron oxide; boron trioxide; disodium octaborate tetrahydrate; their complexes, derivatives and mixtures thereof; elemental sulphur in the range of 0.1% to 90% by weight of the total composition and at least one agrochemical excipient; wherein the composition includes granules in the size range of 0.1 mm to 2.5 mm and comprises particles in the size range of 0.1 micron to 20 microns.

According to an embodiment, the weight ratio of one or more of boron salts, complexes, derivatives or mixtures to elemental sulphur in the form of water dispersible granules is 1:900 to 70:1. According to an embodiment, the weight ratio of one or more of boron salts, complexes, derivatives or mixtures to elemental sulphur in the form of water dispersible granules is 1:90 to 70:1. According to an embodiment, the weight ratio of one or more of boron salts, complexes, derivatives or mixtures to elemental sulphur in the form of water dispersible granules is 1:90 to 3.5:1. According to an embodiment, the weight ratio of one or more of boron salts, complexes, derivatives or mixtures to elemental sulphur in the form of water dispersible granules is 1:10 to 10:1. According to an embodiment, the weight ratio of one or more of boron salts, complexes, derivatives or mixtures to elemental sulphur in the form of water dispersible granules is 1:5 to 5:1. According to an embodiment, the weight ratio of one or more of boron salts, complexes, derivatives or mixtures to elemental sulphur in the form of water dispersible granules is 1:1.5 to 2.5:1. According to an embodiment, the weight ratio of one or more of boron salts, complexes, derivatives or mixtures to elemental sulphur in the form of water dispersible granules 1:1 to 2:1.

According to an embodiment, the crop nutrition and fortification composition is in the form of water dispersible granules, wherein the granules are in the size range of 0.1 to 2.5 mm. Preferably, according to an embodiment, the crop nutrition and fortification composition in the form of water dispersible granules have granule size in the range of 0.1 to 2 mm. Preferably, according to an embodiment, the crop nutrition and fortification composition in the form of water dispersible granules have granule size in the range of 0.1 to 1.5 mm. Preferably, the crop nutrition and fortification composition in the form of water dispersible granules have granule size in the range of 0.1 to 1 mm. Most preferably, the crop nutrition and fortification composition in the form of water dispersible granules have granule size in the range of 0.1 to 0.5 mm.

According to an embodiment, the water dispersible granules are in the form of microgranules. The granule comprises particles in the size range of 0.1 to 20 microns.

According to an embodiment, the crop nutrition and fortification composition is in the form of a liquid suspension. According to an embodiment, the crop nutrition and fortification composition is in the form of a liquid suspension comprises 0.1% to 55% by weight of one or more of boron salts, complexes, derivatives or mixtures thereof and 1% to 65% by weight of elemental sulphur; at least one structuring agent in the range of 0.01% to 5% by weight of the total composition and at least one agrochemically acceptable excipients, wherein the composition comprises particles in the size range of 0.1 micron to 20 microns.

According to an embodiment, the liquid suspension comprises 0.1% to 55% by weight of the one or more of boron, salts, complexes, derivatives or mixtures thereof.

According to an embodiment, the liquid suspension comprises 0.1% to 45% by weight of the one or more of boron salts, complexes, derivatives or mixtures thereof. According to an embodiment, the liquid suspension comprises 0.1% to 35% by weight of the one or more of boron salts, complexes, derivatives or mixtures thereof. According to an embodiment, the liquid suspension comprises 0.1% to 25% by weight of the one or more of boron salts, complexes, derivatives or mixtures thereof. According to an embodiment, the liquid suspension comprises 0.1% to 10% by weight of the one or more of boron salts, complexes, derivatives or mixtures thereof.

According to an embodiment, the crop nutrition and fortification composition in the form of a liquid suspension comprises 1% to 65% by weight of elemental sulphur. According to an embodiment, the crop nutrition and fortification composition in the form of a liquid suspension comprises 1% to 60% by weight of elemental sulphur. According to an embodiment, the crop nutrition and fortification composition in the form of a liquid suspension comprises 1% to 45% by weight of elemental sulphur. According to an embodiment, the liquid suspension comprises 1% to 35% by weight of elemental sulphur. According to an embodiment, the liquid suspension comprises 1% to 20% by weight of elemental sulphur.

According to an embodiment, the crop nutrition and fortification composition is in the form of a liquid suspension comprises one or more of water soluble boron salts or water insoluble boron salts.

According to an embodiment, the crop nutrition and fortification composition in the form of a liquid suspension particularly comprises 0.1% to 55% by weight of one or more water insoluble boron salts, complexes or derivatives thereof, elemental sulphur in the range of 1% to 65% by weight of the total composition; at least one agrochemical excipient and at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension particularly comprises 0.1% to 55% by weight of one or more of calcium borates, magnesium borate, zinc borate, boron phosphate, boron trioxide or diboron trioxide, their complexes, derivatives and mixtures thereof; elemental sulphur in the range of 0.1% to 65% by weight of the total composition; at least one structuring agent in the range of 0.01% to 5% by weight of the total composition and at least one agrochemical excipient; wherein the composition has a particle size in the range of 0.1 micron to 20 microns.

According to an embodiment, the crop nutrition and fortification composition in the form of a liquid suspension comprises 0.1% to 55% by weight of one or more of water soluble boron salts, complexes or derivatives thereof, elemental sulphur in the range of 1% to 65% by weight of the total composition, at least one agrochemical excipient; and at least one structuring agent in the range of 0.01% to 5% by weight of the total composition, wherein the composition has a particle size in the range of 0.1 micron to 20 microns.

According to an embodiment, the crop nutrition and fortification composition in the form of a liquid suspension comprises 0.1% to 55% by weight of one or more of sodium borosilicate; boric acid or orthoboric acid or boracic acid or acidum boricum; borax or sodium borate or sodium tetraborate or sodium tetraborate decahydrate or sodium tetraborate pentahydrate or disodium tetraborate; potassium tetraborate; boron oxide; boron trioxide; disodium octaborate tetrahydrate; their complexes, derivatives and mixtures thereof; elemental sulphur in the range of 0.1% to 65% by weight of the total composition; and at least one structuring agent in the range of 0.01% to 5% by weight of the total composition and at least one agrochemical excipient; wherein the composition has a particle size in the range of 0.1 micron to 20 microns.

According to an embodiment, the weight ratio of one or more of boron salts, complexes, derivatives or mixtures thereof to elemental sulphur in a liquid suspension composition is 1:600 to 55:1. According to an embodiment, the weight ratio of one or more of boron salts, complexes, derivatives or mixtures thereof to elemental sulphur in a liquid suspension composition is 1:50 to 35:1. According to an embodiment, the weight ratio of one or more of boron salts, complexes, derivatives or mixtures to elemental sulphur in a liquid suspension composition is 1:10 to 10:1. According to an embodiment, the weight ratio of one or more of boron salts, complexes, derivatives or mixtures to elemental sulphur in a liquid suspension composition is 1:2.5 to 1.5:1. According to an embodiment, the weight ratio of one or more of boron salts, complexes, derivatives or mixtures to elemental sulphur in a liquid suspension composition is 1:1.

According to an embodiment, the crop nutrition and fortification composition in the form of liquid suspension and water dispersible granules comprise particles in the size range of 0.1 microns to 20 microns, preferably, particles in the size range of 0.1 micron to 15 microns and most preferably in the range of 0.1 to 10 microns. It is observed that the uptake of boron and sulphur is particularly higher with the composition having particles in the size range of about 0.1-20 microns. Thus, the particle size of 0.1-20 microns of the crop nutrition and fortification composition was found to be important not only in terms of ease of application but also in terms of efficacy.

According to an embodiment, the crop nutrition and fortification composition further optionally comprise at least one additional active ingredient which includes one or more of fertilizers, micronutrients, macronutrients, vitamins, microbes, bacteriospores, one or more pesticidal actives, and biostimulants. The microbes, bacteriospores and biostimulants are commercially developed, manufactured and available through various suppliers around the world.

According to an embodiment, the additional active ingredients are present in an amount of 1% to 90% by weight of the crop nutrition and fortification composition. According to an embodiment, the additional active ingredients are present in an amount of 1% to 60% by weight of the crop nutrition and fortification composition. According to an embodiment, the additional active ingredients are present in an amount of 1% to 40% by weight of the crop nutrition and fortification composition. According to an embodiment, the additional active ingredients are present in an amount of 1% to 20% by weight of the crop nutrition and fortification composition.

According to an embodiment, the crop nutrition and fortification composition may optionally comprise at least one fertilizer. Fertilizers are simply crop nutrients applied to agricultural fields to supplement required elements found naturally in the soil. The soil tends to lose its fertilitity due to continuous nutrient uptake by crops, run off losses with water, leaching, volatilization of nutrients and erosion of soil as a result of which the requirement of the crop is not met. Application of fertilizers not only assist in increasing yield and promoting healthy crop but also helps in development of defence against the pest and disease attack. Thus, application of optimum amount and type of fertilizer to the crops is crucial in meeting the nutrient requirement of the crop.

According to an embodiment, the fertilizers include single nutrient fertilizers, multi-nutrient fertilizers, binary fertilizers, compound fertilizers, organic fertilizers or mixtures thereof. According to an embodiment, the fertilizers which are included optionally in the crop nutrition and fortification composition comprise one or more of water soluble fertilizers or water insoluble fertilizers, or salts or complexes or derivatives, or mixtures thereof. However, those skilled in the art will appreciate that it is possible to utilize other fertilizers known in the art, without departing from the scope of the invention.

According to further embodiment, the fertilizers comprise one or more of nitrogen fertilizers, phosphate fertilizers, potash fertilizers, ammonium nitrate, urea, sodium nitrate, potassium fertilizers such as potassium chloride, potassium sulfate, potassium carbonate, potassium nitrate, monoammonium phosphate, diammonium phosphate, calcium ammonium nitrate, super phosphates, phosphogypsum, triple super phosphates, NPK fertilizers or their salts, complexes, derivatives, or mixtures thereof. However, those skilled in the art will appreciate that it is possible to use other fertilizers without departing from the scope of the present invention. The fertilizers are commercially manufactured and available through various companies.

According to an embodiment, the fertilizers are present in an amount of 1% to 90% by weight of the crop nutrition and fortification composition. According to an embodiment, the fertilizers are present in an amount of 1% to 40% by weight of the crop nutrition and fortification composition. According to an embodiment, the -fertilizers are present in an amount of 1% to 20% by weight of the crop nutrition and fortification composition.

According to an embodiment, the crop nutrition and fortification composition may comprise at least one micronutrient. According to another embodiment, the micronutrients comprise one or more of zinc, calcium, manganese, magnesium, copper, iron, silicon, cobalt, chlorine, sodium, molybdenum, chromium, vanadium, selenium, nickel, iodine, fluorine, phosphorous, potassium, in their elemental form, or salts, complexes, derivatives or mixtures thereof. The micronutrients also comprise one or more of vitamins, organic acids or salts, complexes or derivatives or mixtures thereof. However, the above list of optional micronutrients is exemplary and not meant to limit the scope of the invention. Those skilled in the art will appreciate that it is possible to use other micronutrients without departing from the scope of the present invention. The micronutrients are commercially manufactured and available through various companies.

According to an embodiment, the micronutrients are present in an amount of 0.1% to 70% w/w of the composition. According to further embodiment, the micronutrients are present in an amount of 0.1% to 60% w/w of the composition. According to a further embodiment, the micronutrients are present in an amount of 0.1% to 40% w/w of the composition.

According to an embodiment, the composition may further include bio stimulants selected from one or more of, but not limited to, enzymes, humic acid and fulvic acid. The biostimulants used, are commercially manufactured and sourced from various commercial manufacturers around the world. However, those skilled in the art will appreciate that it is possible to utilize different biostimulants without departing from the scope of the present invention.

According to an embodiment, the pesticidal actives include an antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, a insect growth regulator, a mammal repellent, a mating disrupter, a disinfectant, a molluscicide, a antimicrobial, a miticide, an ovicide, a fumigant, a plant activator, a rodenticide thereof, a synergist, a virucide, a microbial pesticide, a plant incorporated protectant, other miscellaneous pesticidal actives, or salts, derivatives and mixtures According to an embodiment, the pesticides are present in an amount of 0.1% to 80% w/w of the total composition. According to further embodiment, the pesticides are present in the amount of 0.1% to 60% w/w of the total composition. According to further embodiment, the optional pesticides are present in the amount of 0.1% to 40% w/w of the total composition.

According to an embodiment, the crop nutrition and fortification composition include agrochemically acceptable excipients such as surfactants, dispersing agents, wetting agents, binders or binding agents, disintegrating agents, fillers or carriers or diluents, emulsifiers, spreading agents, coating agents buffers or pH adjusters or neutralizing agents, antifoaming agents or defoamers, penetrants, preservatives, ultraviolet absorbents, UV ray scattering agents, stabilizers, pigments, colorants, structuring agents, chelating or complexing or sequestering agents, suspending agents or suspension aid agents, humectants, sticking agents, antifreezing agent or freeze point depressants, water miscible solvents and mixtures thereof. However, those skilled in the art will appreciate that it is possible to utilize additional agrochemically acceptable excipients without departing from the scope of the present invention. The agrochemically acceptable excipients are commercially manufactured and available through various companies.

According to an embodiment, the crop nutrition and fortification composition in the form of water dispersible granules further include one or more agrochemically acceptable excipients. These agrochemically acceptable excipients include one or more of disintegrating agents; wetting agents, binders; fillers; carriers or diluents; buffers or pH adjusters or neutralizing agents; antifoaming agents; drift reducing agents; anticaking agents; spreading agents; penetrating agents; and sticking agents. However, those skilled in the art will appreciate that it is possible to utilize additional agrochemically acceptable excipients, without departing from the scope of the present invention.

According to an embodiment, the crop nutrition and fortification composition in the form of liquid suspension includes one or more agrochemically acceptable excipients. According to an embodiment, the agrochemically acceptable excipients comprise one or more surfactants. According to an embodiment, the agrochemically acceptable excipients in the liquid suspension composition further comprise one or more of dispersing agents, humectants, spreading agents, suspending agents or suspension aid, penetrating agents, sticking agents, drift reducing agents, ultraviolet absorbents, UV ray scattering agents, preservatives, stabilizers, buffers or pH adjusters or neutralizing agents, antifreezing agents or freeze point depressants, antifoaming agents, and anticaking agents. However, those skilled in the art will appreciate that it is possible to utilize additional agrochemically acceptable excipients, without departing from the scope of the present invention.

According to an embodiment, the agrochemical excipients are present in a concentration range of 1% to 98.9% by weight of the total composition. According to an embodiment, the agrochemical excipients are present in a concentration range of at least 98% by weight of the total composition. According to an embodiment, the agrochemical excipients are present in a concentration range of at least 95% by weight of the total composition. According to an embodiment, the agrochemical excipients are present in a concentration range of at least 80% by weight of the total composition. According to an embodiment, the agrochemical excipients are present in a concentration range of at least 60% by weight of the total composition. According to an embodiment, the agrochemical excipients are present in a concentration range of at least 40% by weight of the total composition. According to an embodiment, the agrochemical excipients are present in a concentration range of at least 20% by weight of the total composition. According to an embodiment, the agrochemical excipients are present in a concentration range of at least 10% by weight of the total composition. According to an embodiment, the agrochemical excipients are present in a concentration range of at least 5% by weight of the total composition. According to an embodiment, the agrochemical excipients are present in a concentration range of at least 1% by weight of the total composition.

According to an embodiment, the surfactants which are used in the crop nutrition and fortification composition include one or more of anionic, cationic, non-ionic, amphoteric and polymeric surfactants. According to an embodiment, the surfactants include one or more of emulsifiers, wetting agents and dispersing agents.

The anionic surfactants include one or more of, but not limited to a salt of fatty acid, a benzoate, a polycarboxylate, a salt of alkylsulfuric acid ester, alkyl ether sulfates, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyletherdisulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylene-alkylaryl ether sulfate, alkyl sarcosinates, alpha olefin sulfonate sodium salt, alkyl benzene sulfonate or its salts, sodium lauroylsarcosinate, Sulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates-mono and other diesters, phosphate esters, alkyl naphthalene sulfonate-isopropyl and butyl derivatives, alkyl ether sulfates—sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methylpropane sulfonic acid, ammonium lauryl sulfate, ammonium perfluorononanoate, Docusate, Disodium cocoamphodiacetate, Magnesium laureth sulfate, Perfluorobutanesulfonic acid, Perfluorononanoic acid, carboxylates, Perfluoro-octanesulfonic acid, Perfluorooctanoic acid, Phospholipid, Potassium lauryl sulfate, Soap, Soap substitute, Sodium alkyl sulfate, Sodium dodecyl sulfate, Sodium dodecylbenzenesulfonate, Sodium laurate, Sodium laureth sulfate, Sodium lauroylsarcosinate, Sodium myreth sulfate, Sodium nonanoyloxybenzenesulfonate, Sodium pareth sulfate, alkyl carboxylates, Sodium stearate, alpha olefin sulphonates, Sulfolipid, naphthalene sulfonate salts, alkyl naphthalene sulfonate fatty acid salts, naphthalene sulfonate condensates—sodium salt, fluoro carboxylate, fatty alcohol sulphates, alkyl naphthalene sulfonate condensates—sodium salt, a naphthalene sulfonic acid condensed with formaldehyde or a salt of alkylnaphthalene sulfonic acid condensed with formaldehyde; or salts, derivatives thereof. However, those skilled in the art will appreciate that it is possible to utilize other anionic surfactants, without departing from the scope of the present invention.

Cationic surfactants include one or more of, but not limited to Dialkyl dimethyl ammonium chlorides, Alkyl methyl ethoxylated ammonium chlorides or salts, Dodecyl-, Coco-, Hexadecyl-, Octadecyl-, Octadecyl/Behenyl-, Behenyl-, Cocoamidopropyl-, Trimethyl Ammonium Chloride; Coco-, Stearyl-, bis(2-hydroxyethyl)Methyl Ammonium Chloride, Benzalkonium Chloride, Alkyl-, Tetradecyl-, Octadecyl-Dimethyl Benzyl Ammonium Chloride, Dioctyl-, Di(Octyl-Decyl)-, Didecyl-, Dihexadecyl-Distearyl-, Di(Hydrogenated Tallow)-Dimethyl Ammonium Chloride, Di(Hydrogenated Tallow) Benzyl-, Trioctyl-, Tri(Octyl-Decyl)-, Tridodecyl-, Trihexadecyl-Methyl Ammonium Chloride, Dodecyl Trimethyl-, Dodecyl Dimethyl Benzyl-, Di-(Octyl-Decyl) Dimethyl, Didecyl Dimethyl-Ammonium Bromide, quaternised amine ethoxylates, Behentrimonium chloride, Benzalkonium chloride, Benzethonium chloride, Benzododecinium bromide, Bronidox, quaternary ammonium salts Carbethopendecinium bromide, Cetalkonium chloride, Cetrimonium bromide, Cetrimonium chloride, Cetylpyridinium chloride, Didecyldimethylammonium chloride, Dimethyldioctadecylammonium bromide, Dimethyldioctadecylammonium chloride, Domiphen bromide, Lauryl methyl gluceth-10 hydroxypropyldimonium chloride, Octenidinedihydrochloride, Olaflur, N-Oleyl-1, 3-propanediamine, Pahutoxin, Stearalkonium chloride, Tetramethylammonium hydroxide, Thonzonium bromide; salts or derivatives therof. However, those skilled in the art will appreciate that it is possible to utilize other cationic surfactants, without departing from the scope of the present invention.

The non-ionic surfactants include one or more of but are not limited to polyol esters, polyol fatty acid esters, polyethoxylated esters, polyethoxylated alcohols, ethoxylated and propoxylated fatty alcohols, ethoxylated and propoxylated alcohols, EO/PO copolymers; EO and PO block copolymers, di, tri-block copolymers; block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, sodium tallowate, polyoxyethylene glycol, sorbitan alkyl esters, sorbitan derivatives, fatty acid esters of sorbitan (Spans) and their ethoxylated derivatives (Tweens), and sucrose esters of fatty acids, Cetostearyl alcohol, Cetyl alcohol, Cocamide DEA, Cocamide MEA, Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitan monolaurate, Sorbitanmonostearate, Sorbitantristearate, Stearyl alcohol, Surfactin, glyceryl laureate, lauryl glucoside, nonylphenol-polyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, etho-propoxylatedtristyrlphenols, ethoxylated alcohols, polyoxy ethylene sorbitan, fatty acid polyglyceride, a fatty acid alcohol polyglycol ether, acetylene glycol, acetylene alcohol, an oxyalkylene block polymer, a polyoxyethylene alkyl ether, a polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethylene glycerin fatty acid ester, Alcohol ethoxylates—C6 to C16/18 alcohols, linear and branched, Alcohol alkoxylates—various hydrophobes and EO/PO contents and ratios, Fatty acid esters—mono and diesters; lauric, stearic and oleic; Glycerol esters—with and without EO; lauric, stearic, cocoa and tall oil derived, Ethoxylatedglycerine, Sorbitan esters—with and without EO; lauric, stearic and oleic based; mono and trimesters, Castor oil ethoxylates—5 to 200 moles EO; non-hydrogenated and hydrogenated, Block polymers, Amine oxides-ethoxylated and non-ethoxylated; alkyl dimethyl, Fatty amine ethoxylates—coco, tallow, stearyl, oleyl amines, a polyoxyethylene hydrogenated castor oil or a polyoxypropylene fatty acid ester; salts or derivatives, and mixtures thereof. However, those skilled in the art will appreciate that it is possible to utilize other non-ionic surfactants, without departing from the scope of the present invention.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates—sodium lauriminodipropionate, Cocoamidopropylhydroxysulfobetaine, imidazolines, phospholipids phosphatidylserine, phosphatidylethanolamine, phosphatidylcholine, and sphingomyelins, Lauryl Dimethylamine Oxide, alkyl amphoacetates and proprionates, alkyl Ampho(di)acetates, and diproprionates, lecithin and ethanolamine fatty amides; or salts, derivatives therof. However, those skilled in the art will appreciate that it is possible to utilize other amphoteric or zwitterionic surfactants, without departing from the scope of the present invention.

Surfactants that are commercially available under the trademark, include, but are not limited to Atlas G5000, TERMUL 5429, TERMUL 2510, ECOTERIC®, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij®, Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, IGEPAL CA-630 and Isoceteth-20.

However, those skilled in the art will appreciate that it is possible to utilize other conventionally known surfactants without departing from the scope of the present invention. The surfactants are commercially manufactured and available through various companies.

According to an embodiment, the surfactants are present in the amount of 0.1% to 60% w/w of the total composition. According to an embodiment, the surfactants are present in the amount of 0.1% to 50% w/w of the total composition. According to an embodiment, the surfactants are present in the amount of 0.1% to 40% w/w of the total composition. According to an embodiment, the surfactants are present in the amount of 0.1% to 30% w/w of the total composition. According to a further embodiment, the surfactants are present in the amount of 0.1% to 20% w/w of the total composition. According to an embodiment, the surfactants are present in the amount of 0.1% to 10% w/w of the total composition.

According to an embodiment, the solvent used in the crop nutrition and fortification composition includes water miscible solvents. The water miscible solvents include but are not limited to one or more of 1,4-Dioxane, Ethylene glycol, Glycerol, N-Methyl-2-pyrrolidone, 1,3-Propanediol, 1,5-Pentanediol, Propylene glycol, Triethylene glycol, 1,2-Butanediol, 1,3-Butanediol, 1,4-Butanediol, Dimethylformamide, Dimethoxyethane, Dimethyloctanamide and Dimethyldecanamide or mixtures thereof. However, those skilled in the art will appreciate that it is possible to utilize other water miscible solvents without departing from the scope of the present invention. According to an embodiment, the solvents are present in the amount of 0.1-95% w/w of the total composition. According to an embodiment, the solvents are present in the amount of 0.1-60% w/w of the total composition. According to an embodiment, the solvents are present in the amount of 0.1-40% w/w of the total composition. According to an embodiment, the solvents are present in the amount of 0.1-30% w/w of the total composition.

According to an embodiment, the dispersing agents which are used in the crop nutrition and fortification composition include but are not limited to one or more of polyvinyl pyrrolidone, polyvinyl alcohol, lignin sulphonates, phenyl naphthalene sulphonates, alkali metal, alkaline earth metal and ammonium salts of lignosulfonic acid, lignin derivatives, dibutylnaphthalene-sulfonic acid, alkylarylsulfonates, alkyl sulfates, alkylsulfonates, fatty alcohol sulfates, fatty acids and sulfated fatty alcohol glycol ethers, polyoxyethylene alkyl ethers, dioctyl sulfosuccinate, lauryl sulfate, polyoxyethylene alkyl ether sulphate, polyoxyethylenestyryl phenyl ether sulfate ester salts and the like, alkali metal salts salt thereof, ammonium salts or amine salts, polyoxyethylene alkyl phenyl ether, polyoxyethylenestyryl phenyl ether, polyoxyethylene alkyl esters, or polyoxyethylenesorbitan alkyl esters, and the like, mixture of sodium salt of naphthalene sulphonic acid urea formaldehyde condensate and sodium salt of phenol sulphonic formaldehyde condensate ethoxylated alkyl phenols, ethoxylated fatty acids, alkoxylated linear alcohols, polyaromatic sulfonates, sodium alkyl aryl sulfonates, glyceryl esters, ammonium salts of maleic anhydride copolymers, maleic anhydride copolymers, phosphate esters, condensation products of aryl sulphonic acids and formaldehyde, addition products of ethylene oxide and fatty acid esters, salts of addition products of ethylene oxide and fatty acid esters, sodium salt of isodecylsulfosuccinic acid half ester, polycarboxylates, sodium alkyl benzene sulfonates, sodium salts of sulfonated naphthalene, ammonium salts of sulfonated naphthalene, salts of polyacrylic acids, sodium salts of condensed phenolsulfonic acid as well as the napthalene sulfonate-formaldehyde condensates, sodium naphthalene sulfonate formaldehyde condensates, tristyrylphenolethoxylate phosphate esters; aliphatic alcohol ethoxylates; alkyl ethoxylates; EO-PO block copolymers; graft copolymers, ammonium salts of sulfonated naphthalene, salts of polyacrylic acids.

Commercially available dispersing agents include "Morwet D425" (sodium naphthalene formaldehyde condensate ex Witco Corporation, USA) "Morwet EFW" Sulfated Alkyl Carboxylate and Alkyl Naphthalene Sulfonate—Sodium Salt "Tamol PP" (sodium salt of a phenolsulphonic acid condensate) "Reax 80N" (sodium lignosulphonate) "Wettol D1" sodium alkylnaphthalene sulphonate (ex BASF). However, those skilled in the art will appreciate that it is possible to utilize other conventionally known dispersing agents without departing from the scope of the present invention. The dispersing agents are commercially manufactured and available through various companies. According to an embodiment, the dispersing agents are present in the amount of 0.1%-60% w/w of the total composition. According to an embodiment, the dispersing agents are present in the amount of 0.1%-30% w/w of the total composition. According to an embodiment, the dispersing agents are present in the amount of 3%-20% w/w of the total composition.

According to an embodiment, the wetting agents used in the crop nutrition and fortification composition include but are not limited to one or more of phenol naphthalene sulphonates, alkyl naphthalene sulfonate, sodium alkyl naphthalene sulfonate, sodium salt of sulfonated alkylcarboxylate, polyoxyalkylated ethyl phenols, polyoxyethoxylated fatty alcohols, polyoxyethoxylated fatty amines, lignin derivatives, alkane sulfonates, alkylbenzene sulfonates, salts of polycarboxylic acids, salts of esters of sulfosuccinic acid, alkylpolyglycol ether sulfonates, alkyl ether phosphates, alkyl ether sulphates and alkyl sulfosuccinic monoesters. However, those skilled in the art will appreciate that it is possible to utilize other conventionally known wetting agents without departing from the scope of the present invention. The wetting agents are commercially manufactured and available through various companies. According to an embodiment, the wetting agents are present in the amount of 0.1%-60% w/w of the total composition. According to an embodiment, the wetting agents are present in the amount of 0.1%-40% w/w of the total composition. According to an embodiment, the wetting agents are present in the amount of 0.1%-30% w/w of the total composition.

Emulsifiers which is used in the crop nutrition and fortification composition include but are not limited to one or more of Atlas G5000, TERMUL 5429, TERMUL 2510, ECOTERIC®, EMULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80, Span20, 40, 60, 80, 83, 85, 120, Brij®, Triton™ Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80 and Span 20, 40, 60, 80, 83, 85, 120 or mixtures thereof. However, those skilled in the art will appreciate that it is possible to utilize other conventionally known emulsifiers or surfactants without departing from the scope of the present invention. The emulsifiers are commercially manufactured and available through various companies. According to an embodiment, the emulsifier is present in the amount of 0.1%-60% w/w of the total composition. According to an embodiment, the emulsifier is present in the amount of 0.1%-50% w/w of the total composition. According to an embodiment, the emulsifier is present in the amount of 0.1%-30% w/w of the total composition.

According to an embodiment, the disintegrating agents which are used in the crop nutrition and fortification composition include, but not limited to one or more of inorganic water soluble salts e.g. sodium chloride, nitrate salts; water soluble organic compounds such as agar, hydroxypropyl starch, carboxymethyl starch ether, tragacanth, gelatin, casein, microcrystalline cellulose, cross-linked sodium carboxymethyl cellulose, carboxymethyl cellulose, sodium tripolyphosphate, sodium hexametaphosphate, metal stearates, a cellulose powder, dextrin, methacrylate copolymer, Polyplasdone® XL-10 (crosslinked polyvinylpyrrolidone), poly(vinylpyrrolidone), polyaminocarboxylic acid chelate compound, salts of polyacrylates of methacrylates, starch-polyacrylonitrile graft copolymer, sodium or potassium bicarbonates/carbonates or their mixtures or salts with acids such as citric and fumaric acid, or salts, derivatives or mixtures thereof. However, those skilled in the art will appreciate that it is possible to utilize different disintegrating agents without departing from the scope of the present invention. The disintegrating agents are commercially manufactured and available through various companies.

According to an embodiment, the disintegrating agents are present in the amount of 0.1% to 50% w/w of the composition. According to an embodiment, the disintegrating agents are present in the amount of 0.1% to 30% w/w of the composition. According to an embodiment, the disintegrating agents are present in the amount of 0.1% to 20% w/w of the composition. According to an embodiment, the disintegrating agents are present in the amount of 0.1% to 10% w/w of the composition.

According to an embodiment, the binding agents or binders which are used in the crop nutrition and fortification composition include, but are not limited to, at least one of proteins, lipoproteins, lipids, glycolipid, glycoprotein, carbohydrates such as monosaccharides, disaccharides, oligosaccharides and polysaccharides, complex organic substance, synthetic organic polymers or derivatives and combinations thereof. The binding agents also include corn syrup, celluloses such as carboxymethyl cellulose, ethyl cellulose, hydroxyethyl cellulose, hydroxy-methylethyl cellulose, hydroxyethylpropyl cellulose, methyl hydroxyethyl cellulose, methyl cellulose; starches; 1, starch acetates, starch hydroxyethyl ethers, ionic starches, long-chain alkyl starches, corn starch, potato starch, xanthan gum, glycogen, agar, gluten, alginic acid, phycocolloids, gum arabic, guar gum, gum karaya, gum tragacanth and locust bean gum. The binding agents or binder also include complex organic substances such as phenyl naphthalene sulphonate, lignin and nitrolignin, derivatives of lignin such as lignosulfonate salts illustratively including calcium lignosulfonate and sodium lignosulfonate and complex carbohydrate-based compositions containing organic and inorganic ingredients such as molasses. The binding agents also include synthetic organic polymers such as ethylene oxide polymers or copolymers, propylene oxide copolymer, polyethylene glycols, polyethylene oxides, polyacrylamides, polyacrylates, polyvinyl pyrrolidone, polyalkylpyrrolidone, polyvinyl alcohol, polyvinylmethyl ether, polyvinyl acrylates, poly(vinyl acetate), sodium polyacrylate, polylactic acid, polyethoxylated fatty acids, polyethoxylated fatty alcohols, latex and the like) or salts, derivatives thereof. However, those skilled in the art will appreciate that it is possible to utilize different binding agents without departing from the scope of the present invention. The binding agents are commercially manufactured and available through various companies.

According to further embodiment, the binding agent is present in an amount of 0.1% to 50% w/w of the composition. According to further embodiment, the binding agent is present in an amount of 0.1% to 30% w/w of the composition According to further embodiment, the binding agent is present in an amount of 0.1% to 20% w/w of the composition. According to further embodiment, the binding agent is present in an amount of 0.1% to 10% w/w of the composition.

According to an embodiment, the carriers which are used in the crop nutrition and fortification composition include, but are not limited to one or more of solid carriers or fillers or diluents. According to another embodiment, the carriers include mineral carriers, plant carriers, synthetic carriers, water-soluble carriers. However, those skilled in the art will appreciate that it is possible to utilize different carriers without departing from the scope of the present invention. The carriers are commercially manufactured and available through various companies.

The solid carriers include natural minerals like clay such as china clay, acid clay, kaolin such as kaolinite, dickite, nacrite, and halloysite, serpentines such as chrysotile, lizardite, antigorite, and amesite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobalite and quartz, attapulgite and sepiolite; dolomite, gypsum, tuff, vermiculite, laponite, pumice, bauxite, hydrated aluminas, calcined alumina, perlite, sodium bicarbonate, volclay, vermiculites, limestone, natural and synthetic silicates; charcoal, silicas, wet process silicas, dry process silicas, calcined products of wet process silicas, surface-modified silicas, mica, zeolite, diatomaceous earth, calcined aluminas, derivatives thereof; chalks (Omya®), fuller's earth, loess, mirabilite, white carbon, slaked lime, synthetic silicic acid, starch, cellulose, cellulose, chaff, wheat flour, wood flour, starch, rice bran, wheat bran, and soybean flour, tobacco powder, a vegetable powder polyethylene, polypropylene, poly(vinylidene chloride), methyl cellulose, hydroxypropyl cellulose, hydroxypropyl methylcellulose, sodium carboxymethyl cellulose, propylene glycol alginate, polyvinylpyrrolidone, carboxyvinyl polymer, casein sodium, sodium chloride, salt cake, potassium pyrophosphate, sodium tripolyphosphate, maleic acid, fumaric acid, and malic acid or derivatives or mixtures thereof. Commercially available Silicates are Aerosil brands, Sipernat brands such as Sipernat® 50S and CALFLO E, and kaolin 1777. However, those skilled in the art will appreciate that it is possible to utilize different solid carriers without departing from the scope of the present invention. The solid carriers are commercially manufactured and available through various companies.

According to an embodiment, carrier is present in an amount of 0.1% to 98% w/w of the composition. According to further embodiment carrier is present in an amount of 0.1% to 80% w/w of the composition. According to further embodiment carrier is present in an amount of 0.1% to 60% w/w of the composition. According to further embodiment carrier is present in an amount of 0.1% to 40% w/w of the composition. According to further embodiment carrier is present in an amount of 0.1% to 20% w/w of the composition.

According to an embodiment, the anticaking agents which are used in the crop nutrition and fortification composition include, but are not limited to one or more of polysaccharides such as starch, alginic acid, poly(vinylpyrrolidone), fumed silica (white carbon), ester gum, a petroleum resin, Foammaster® Soap L sodium stearate, Brij® 700 polyoxyethylene (100) stearylether, Aerosol® OT-B sodium dioctyl sulfosuccinate, Silwet® L-77 silicone-polyether copolymer, sodium metasilicate, sodium alkyl sulfosuccinates, sodium carbonate or bicarbonate, salts or derivatives thereof. However, those skilled in the art will appreciate that it is possible to utilize different anti caking agents without departing from the scope of the present invention. The anti caking agents are commercially manufactured and available through various companies.

According to an embodiment, the antifoaming agents or defoamers which are used in the crop nutrition and fortification composition include, but not limited to one or more of silica, siloxane, silicone dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoroorganic compounds. However, those skilled in the art will appreciate that it is possible to utilize other conventionally known antifoaming agents without departing from the scope of the present invention.

The antifoaming agents are commercially manufactured and available through various companies. According to an embodiment, the anti-foaming agent is present in an amount of 0.01% to 20% w/w of the total composition. According to an embodiment, the anti-foaming agent is present in an amount of 0.01% to 10% w/w of the total composition. According to an embodiment, the anti-foaming agent is present in an amount of 0.01% to 5% w/w of the total composition. According to an embodiment, the anti-foaming agent is present in an amount of 0.01% to 1% w/w of the total composition.

According to an embodiment, the pH-adjusters or buffers or neutralizing agents which are used in the crop nutrition and fortification composition include both acids and bases of the organic or inorganic type and mixtures thereof. According to further embodiment, pH-adjusters or buffers or neutralizing agents include, but not limited to organic acids, inorganic acids and alkali metal compounds or salts, derivatives or mixtures thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include hydroxides of alkali metals such as sodium hydroxide and potassium hydroxide, carbonates of alkali metals, hydrogencarbonates of alkali metals such as sodium hydrogen carbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention.

The pH-adjusters or buffers or neutralizing agents are commercially manufactured and available through various companies. According to an embodiment, the pH-adjusters or buffers are present in an amount of 0.01% to 20% w/w of the total composition. According to an embodiment, the pH-adjusters or buffers are present in an amount of 0.01% to 10% w/w of the total composition. According to an embodiment, the pH-adjusters or buffers are present in the amount of 0.01% to 5% w/w of the total composition. According to an embodiment, the pH-adjusters or buffers are present in the amount of 0.01% to 1% w/w of the total composition.

According to an embodiment, the spreading agents which are used in the crop nutrition and fortification composition include, but not limited to one or more of cellulose powder, crosslinked poly(vinylpyrrolidone), a half ester of a polymer consisting of polyhydric alcohol with dicarboxylic anhydride, a water-soluble salt of polystyrenesulfonic acid, fatty acids, latex, aliphatic alcohols, vegetable oils such as cottonseed, or inorganic oils, petroleum distillates, modified trisiloxanes, polyglycol, polyethers, clatharates or salts or derivatives thereof. However, those skilled in the art will appreciate that it is possible to utilize other conventionally known spreading agents without departing from the scope of the present invention. The spreading agents are commercially manufactured and available through various companies. According to an embodiment, the spreading agent is present in an amount of 0.1% to 20% w/w of the total composition. According to an embodiment, the spreading agent is present in an amount of 0.1% to 10% w/w of the total composition. According to an embodiment, the spreading agent is present in an amount of 0.1% to 5% w/w of the total composition. According to an embodiment, the spreading agent is present in an amount of 0.1% to 1% w/w of the total composition.

According to an embodiment, the sticking agents which are used in the crop nutrition and fortification composition include, but not limited to one or more of paraffin, a polyamide resin, polyacrylate, polyoxyethylene, wax, polyvinyl alkyl ether, an alkylphenol-formalin condensate, fatty acids, latex, aliphatic alcohols, vegetable oils such as cottonseed, or inorganic oils, petroleum distillates, modified trisiloxanes, polyglycol, polyethers, clatharates, a synthetic resin emulsion or salts or derivatives therof. However, those skilled in the art will appreciate that it is possible to utilize other conventionally known sticking agents without departing from the scope of the present invention. The sticking agents are commercially manufactured and available through various companies. According to an embodiment, the sticking agent is present in an amount of 0.1% to 30% w/w of the total composition. According to an embodiment, the sticking agent is present in an amount of 0.1% to 20% w/w of the total composition. According to an embodiment, the sticking agent is present in an amount of 0.1% to 10% w/w of the total composition.

According to an embodiment, the stabilizers which are used in the crop nutrition and fortification composition include, but not limited to one or more of peroxide compounds such as hydrogen peroxide and organic peroxides, alkyl nitrites such as ethyl nitrite and alkyl glyoxylates such as ethyl glyoxylate, zeolite, antioxidants such as phenol compounds, amine compounds, sulfur compounds, phosphoric acid compounds and the like; ultraviolet absorbers such as salicylic acid compounds, benzophenone compounds or derivatives thereof. However, those skilled in the art will appreciate that it is possible to utilize other conventionally known stabilizers without departing from the scope of the present invention. The stabilizers are commercially manufactured and available through various companies. According to an embodiment, the stabilizer is present in an amount of 0.1% to 30% w/w of the total composition. According to an embodiment, the stabilizer is present in an amount of 0.1% to 20% w/w of the total composition. According to an embodiment, the stabilizer is present in an amount of 0.1% to 10% w/w of the total composition.

According to an embodiment, the preservatives which are used in the crop nutrition and fortification composition include but not limited to one or more of bactericides, anti-fungal agents, biocides, anti-microbial agents, and antioxidant. Non limiting examples of preservatives include one or more of benzoic acid, its esters and salts, para-hydroxybenzoic acid (paraben), its esters and salts, propionic acid and its salts, salicylic acid and its salts, 2,4-hexadienoic acid (sorbic acid) and its salt, formaldehyde and paraformaldehyde, 1,2-benzisothiazolin-3-one, 2-hydroxybiphenyl ether and its salts, 2-zincsulfidopyridine N-oxide, inorganic sulfites and bisulfites, sodium iodate, chlorobutanol, dehydraacetic acid, formic acid, 1,6-bis(4-amidino-2-bromophenoxy)-n-hexane and its salts, 10-undecylenic acid and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl)urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2,4-dioximidazolidin-5-yl)urea), poly(hexamethylenediguanide) hydrochloride, 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4-imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioximidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy)propane-1,2-diol, Hyamine, alkyl(C8-C18) dimethylbenzylammonium chloride, alkyl(C8-C18) dimethylbenzylammonium bromide, alkyl(C8-C18) dimethylbenzylammonium saccharinate, benzyl hemiformal, 3-iodo-2-propynyl butylcarbamate, sodium hydroxymethylaminoacetate, cetyltrimethylammonium bromide, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Proxel® from ICI or Acticide® RS from Thor Chemie and Kathon® MK from Rohm & Haas, Bacto-100, thimerosal, Sodium Propinoate, Sodium Benzoate, Propyl Paraben, Propyl Paraben Sodum, Potassium Sorbate, Potassium Benzoate, Phenyl Mercuric Nitrate, Phenyl Ethyl Alcohol, Sodium, Ethylparaben, Methylparaben, Butylparaben, Benzyl Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2', 4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and boraxor salts or derivatives thereof. Antioxidants includes but not limited to one or more of imidazole and imidazole derivatives (e.g. urocanic acid), 4,4'-thiobis-6-t-butyl-3-methylphenol, 2,6-di-t-butyl-p-cresol (BHT), and pentaerythrityltetrakis [3-(3,5,-di-t-butyl-4-hydroxyphenyl)]propionate; amine antioxidants such as N,N'-di-2-naphthyl-p-phenylenediamine; hydroquinoline antioxidants such as 2,5-di(t-amyl)hydroquinoline; and phosphorus-containing antioxidants such as triphenyl phosphate, carotenoids, carotenes (e.g. α-carotene, β-carotene, lycopene) and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, and the glycosyl, N-acetyl, methyl, ethyl, propyl, amyl, butyl, lauryl, palmitoyl, oleyl, γ-linoleyl, cholesteryl and glyceryl esters thereof), and salts thereof, dilaurylthiodipropionate, distearylthiodipropionate, thiodipropionic acid and derivatives thereof (esters, ethers, lipids, nucleotides, nucleosides and salts), and sulfoximine compounds (e.g. buthioninesulfoximi-nes, homocysteine sulfoximine, buthionine sulfones, penta-, hexa-, heptathioninesul-foximine) in very low tolerated doses (e.g. pmol/kg to pmol/kg), also metal chelating agents (e.g. α-hydroxy fatty acids, EDTA, EGTA, phytic acid, lactoferrin), α-hydroxy acids (e.g. citric acid, lactic acid, malic acid), humic acids, gallic esters (e.g. propyl, octyl and dodecyl gallate), unsaturated fatty acids and derivatives, hydroquinone and derivatives thereof (e.g. arbutin), ubiquinone and ubiquinol, and derivatives thereof, ascorbyl palmitate, stearate, di-palmitate, acetate, Mg ascorbyl phosphates, sodium and magnesium ascorbate, diso-diumascorbyl phosphate and sulfate, potassium ascorbyltocopheryl phosphate, isoascorbic acid and derivatives thereof, the coniferyl benzoate of benzoin resin, rutin, rutinic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3, 5-di-tert-butyl-4-hydroxyphenyl)propionate, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). However, those skilled in the art will appreciate that it is possible to utilize other conventionally known preservatives without departing from the scope of the present invention. The preservatives are commercially manufactured and available through various companies.

According to further embodiment, the preservatives or bactericides or anti-fungal agents or biocides or anti-microbial agents or antioxidant are present in an amount of 0.1% to 20% w/w of the total composition. According to further embodiment, the preservatives or bactericides or anti-fungal agents or biocides or anti-microbial agents or antioxidant are present in an amount of 0.1% to 10% w/w of the total composition. According to further embodiment, the preservative or bactericides or anti-fungal agents or biocides or anti-microbial agents or antioxidant is present in an amount of 0.1% to 5% w/w of the total composition. According to further embodiment, the preservative or bactericides or anti-fungal agents or biocides or anti-microbial agents or antioxidant is present in an amount of 0.1% to 1% w/w of the total composition.

According to an embodiment, the structuring agent which is used in the crop nutrition and fortification composition includes one or more of thickeners, viscosity modifiers, tackifiers, suspension aids, rheological modifiers or anti-settling agents. A structuring agent prevents sedimentation of the active ingredient particles after prolonged storage.

According to an embodiment, the structuring agents which are used in the liquid suspension composition include, but not limited to one or more polymers such as polyacrylics, polyacrylamides, polysaccharides, hydrophobically modified cellulose derivatives, co-polymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays with high surface area silica and natural gums such as guar gum, xanthan gum, gum Arabic, gum tragacanth, rhamsan gum, locust bean gum, carageenan, welan gum, veegum, gelatin, dextrin, collagen; polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylatedanhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine, poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such as starch acetates, starch hydroxyethyl ethers, ionic starches, long-chain alkyl starches, corn starch, amine starches, phosphates starches, and dialdehyde starches; plant starches such as corn starch and potato starch; other carbohydrates such as pectin, amylopectin, glycogen, agar, gluten, alginic acid, phycocolloids, or derivatives thereof. However, those skilled in the art will appreciate that it is possible to utilize other conventionally known structuring agents without departing from the scope of the present invention.

Preferred structuring agents include one or more of xanthan gum, aluminum silicate, methylcellulose, carboxymethylcellulose, polysaccharide, alkaline earth metal silicate, gelatin, and polyvinyl alcohol. The structuring agents are commercially manufactured and available through various companies.

According to an embodiment, the structuring agent is present in an amount of 0.01% to 5% w/w of the composition. According to an embodiment, the structuring agent is present in an amount of 0.01% to 4% w/w of the composition. According to an embodiment, the structuring agent is present in an amount of 0.01% to 3% w/w of the composition. According to an embodiment, the structuring agent is present in an amount of 0.01% to 2% w/w of the composition. According to an embodiment, the structuring agent is present in an amount of 0.01% to 1% w/w of the composition. According to an embodiment, the structuring agent is present in an amount of 0.01% to 0.1% w/w of the composition.

According to an embodiment, the antifreezing agents or freezing point depressants used in the liquid suspension composition include, but are not limited to one or more of polyhydric alcohols such as ethylene glycol, diethylene glycol, dipropylene glycol, propylene glycol, butyrolactone, N,N-dimethyl-formamide, glycerol, monohydric or polyhydric alcohols, glycol ethers, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropyleneglycol. or urea, especially calcium chloride, isopropanol, propylene glycol monomethyl ether, di- or tripropylene glycol monomethyl ether or cyclohexanol. However, those skilled in the art will appreciate that it is possible to utilize different antifreezing agents without departing from the scope of the present invention. The antifreezing agents are commercially manufactured and available through various companies.

According to an embodiment, the chelating or complexing or sesquitering agents which are used in the liquid suspension composition include, but not limited to one or more of polycarboxylic acids such as polyacrylic acid and the various hydrolyzed poly(methyl vinyl ether/maleic anhydride); aminopolycarboxylic acids, such as N-hydroxyethyliminodiacetic acid, nitrilotriacetic acid (NTA), N,N,N',N'-ethylenediaminetetraacetic acid, N-hydroxyethyl-N,N',N'-ethylenediaminetriacetic acid and N,N,N',N'',N''-diethylenetriaminepentaacetic acid; α-hydroxy acids, such as citric acid, tartaric acid and gluconic acid; orthophosphates, such as trisodium phosphate, disodium phosphate, monosodium phosphate; condensed phosphates, such as sodium tripolyphosphate, tetrasodium pyrophosphate, sodium hexametaphosphate and sodium tetrapolyphosphate; 5-sulfo-8-hydroxyquinoline; and 3,5-disulfopyrocatechol, amino polycarboxylates, ethylene diamine tetraacetic acid (EDTA), diethylenetriaminepentaacetic acid (DTPA), N-hydroxyethyl-ethylenediamine-triacetic acid (HEDTA), ethylenediaminediacetate (EDDA), ethylenediaminedi(o-hydroxyphenylacetic) acid (EDDHA), cyclohexane diamine tetraacetic acid (CDTA), polyethyleneaminepolyacetic acids, lignosulfonate, Ca—, K—, Na—, and ammonium lignosulfonates, fulvic acid, ulmic acid, nucleic acids, humic acid, pyrophosphate, chelating resins such as imino di-acetic acid and the like or derivatives thereof. However, those skilled in the art will appreciate that it is possible to utilize other chelating or complexing or sesquitering agents without departing from the scope of the present invention. The chelating or complexing or sesquitering agents are commercially manufactured and available through various companies.

According to an embodiment, the penetrant which is used in the liquid suspension composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethylformamide, dimethylacetamide, or dimethyl sulfoxide, polyoxyethylenetrimethylolpropanemonooleate, polyoxyethylenetrimethylolpropanediole ate, polyoxyethylenetrimethylolpropanetrioleate, polyoxyethylenesorbitanmonooleate, and polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, the ultraviolet absorbent is selected from, but are not limited to one or more of 2-(2'-hydroxy-5'-methylphenyl)benzotriazole, 2-ethoxy-T-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl)benzotriazole and 2-(2'-hydroxy-4'-n-octoxyphenyl)benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, and dimethyl succinate-1-(2-hydroxyethyl)-4-hydroxy-2,2,6,6-tetramethylpiperidine polycondensate or derivatives or the like. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents includes titanium dioxide or the like may be used. However, those skilled in the art will appreciate that it is possible to utilize different UV ray scattering agents, without departing from the scope of the present invention. Such UV ray scattering agents are commercially manufactured and available through various companies.

According to an embodiment, the humectant is selected from, but not limited to one or more of polyoxyethylene/polyoxypropylene copolymers, particularly block copolymers, such as the Synperonic PE series of copolymers available from Uniqema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol compounds such as propylene glycol ether, derivatives thereof. Also other humectants include aloe vera gel, alpha hydroxyl acids such as lactic acid, egg yolk and eggwhite, glyceryl triacetate, honey, lithium chloride, etc. The non-ionic surfactants mentioned above also act as humectants. However, those skilled in the art will appreciate that it is possible to utilize other conventionally known humectants without departing from the scope of the present invention. The humectants are commercially manufactured and available through various companies.

According to an embodiment, the humectant is present in the range of 0.1% to 90% w/w of the total composition. According to an embodiment, the humectant is present in the range of 0.1% to 70% w/w of the total composition. According to an embodiment, the humectant is present in the range of 0.1% to 60% w/w of the total composition. According to an embodiment, the humectant is present in the range of 0.1% to 50% w/w of the total composition. According to an embodiment, the humectant is present in the range of 0.1% to 30% w/w of the total composition. According to an embodiment, the humectant is present in the range of 0.1% to 10% w/w of the total composition.

The inventors have further determined that the composition of the present invention surprisingly has enhanced physical properties of dispersibility, suspensibility, flowability, wetting time, good pourability, reduced viscosity, provides ease of handling and also reduces the loss of material while handling the product at the time of packaging as well as during field application. Surprisingly, the inventors have also determined that the crop nutrition and fortification composition in the form of liquid suspension and water dispersible granules display superior efficacy at reduced dosages compared to prior art composition.

Dispersibility of the water dispersible granular crop nutrition and fortification composition is a measure of percent dispersion. Dispersibility is calculated by the minimum percent dispersion. Dispersibility is defined as the ability of the granules to disperse upon addition to a liquid such as water or a solvent. To determine dispersibility of the granular composition as per the standard CIPAC test, MT 174, a known amount of the granular composition was added to a defined volume of water and mixed by stirring to form a suspension. After standing for a short period, the top nine-tenths are drawn off and the remaining tenth dried and determined gravimetrically. The method is virtually a shortened test of suspensibility and is appropriate for establishing the ease with which the granular composition dispersed uniformly in water.

It is observed that the crop nutrition and fortification composition in the form of water dispersible granules exhibits almost instantaneous dispersion, thus making the actives readily available to the crop. According to an embodiment, the crop nutrition and fortification composition in the form of water dispersible granules has a dispersibility of at least 40%. According to an embodiment, the crop nutrition and fortification composition in the form of water dispersible granules has a dispersibility of at least 50%. According to an embodiment, the water dispersible granules have a dispersibility of at least 60%. According to an embodiment, the water dispersible granules have a dispersibility of at least 70%. According to an embodiment, the water dispersible granules have a dispersibility of at least 80%. According to an embodiment, the water dispersible granules have a dispersibility of at least 90%. According to an embodiment, the water dispersible granules have a dispersibility of at least 99%. According to an embodiment, the water dispersible granules have a dispersibility of 100%.

According to an embodiment, the crop nutrition and fortification composition in the form of water dispersible granules and liquid suspension exhibits good suspensibility. Suspensibility is defined as the amount of active ingredient suspended after a given time in a column of liquid, of stated height, expressed as a percentage of the amount of active ingredient in the original suspension. The water dispersible granules can be tested for suspensibility as per the CIPAC Handbook, "MT 184 Test for Suspensibility" whereby a suspension of known concentration of the granular composition in CIPAC Standard Water was prepared and placed in a prescribed measuring cylinder at a constant temperature, and allowed to remain undisturbed for a specified time. The top 9/10ths were drawn off and the remaining 1/10th was then assayed, either chemically, gravimetrically, or by solvent extraction, and the suspensibility was calculated.

The suspensibility of the liquid suspension is the amount of active ingredient suspended after a given time in a column of liquid, of stated height, expressed as a percentage of the amount of active ingredient in the original suspension. The suspensibility of the liquid suspension is determined as per CIPAC MT-161 by preparing 250 ml of diluted suspension, allowing it to stand in a measuring cylinder under defined conditions, and removing the top nine-tenths. The remaining tenth portion is then assayed either chemically, gravimetrically or by solvent extraction, and the suspensibility is calculated.

According to an embodiment, the crop nutrition and fortification composition in the form of water dispersible granules and liquid suspension has a suspensibility of at least 30%. According to an embodiment, the crop nutrition and fortification composition in the form of water dispersible granules and liquid suspension has a suspensibility of at least 40%. According to an embodiment, the crop nutrition and fortification composition in the form of water dispersible granules and liquid suspension has a suspensibility of at least 50%. According to an embodiment, the crop nutrition and fortification composition in the form of water dispersible granules and liquid suspension has a suspensibility of at least 60%. According to an embodiment, the crop nutrition and fortification composition in the form of water dispersible granules and liquid suspension has a suspensibility of at least 70%. According to an embodiment, the crop nutrition and fortification composition in the form of water dispersible granules and liquid suspension has a suspensibility of at least 80%. According to an embodiment, the crop nutrition and fortification composition in the form of water dispersible granules and liquid suspension has a suspensibility of at least 90%. According to an embodiment, the crop nutrition and fortification composition in the form of water dispersible granules and liquid suspension has a suspensibility of at least 99%. According to an embodiment, the crop nutrition and fortification composition in the form of liquid suspension has a suspensibility of 100%.

According to an embodiment, the crop nutrition and fortification composition in the form of water dispersible granules has almost no hardness. The hardness exhibited by the granules can be estimated by hardness testers such as the ones provided by Shimadzu, Brinell Hardness (AKB-3000 Model), Mecmesin, Agilent, Vinsyst, Ametek and Rockwell.

According to an embodiment, the crop nutrition and fortification composition in the form of water dispersible granules and liquid suspension demonstrates superior stability towards heat, light, temperature and caking. According to further embodiment, the stability exhibited by the crop nutrition and fortification composition is more than 3 years. According to further embodiment, the stability exhibited by the crop nutrition and fortification composition is more than 2 years. According to further embodiment, the stability exhibited by the crop nutrition and fortification composition is more than 1 year. According to further embodiment, the stability exhibited by the crop nutrition and fortification composition is more than 10 months. According to further embodiment, the stability exhibited by the crop nutrition and fortification composition is more than 8 months. According to further embodiment, the stability exhibited by the crop nutrition and fortification composition is more than 6 months. According to further embodiment, the stability exhibited by the crop nutrition and fortification composition is more than 3 months.

Wettability is the condition or the state of being wettable and can be defined as the degree to which a solid is wetted by a liquid, measured by the force of adhesion between the solid and liquid phases. The wettability of the granular composition is measured using the Standard CIPAC Test MT-53 which describes a procedure for the determination of the time of complete wetting of wettable formulations. A weighed amount of the granular composition can be dropped on water in a beaker from a specified height and the time for complete wetting was determined. According to another embodiment, the water dispersible granular composition has wettability of less than 2 minutes. According to another embodiment, the water dispersible granular composition has a wettability of less than 1 minute. According to another embodiment, the water dispersible granular composition has a wettability of less than 30 seconds.

According to an embodiment, the crop nutrition and fortification composition in the form of liquid suspension passes the wet sieve retention test. The test is used to determine the amount of non-dispersible material in the formulations that are applied as dispersions in water. The wet sieve retention value of the crop nutrition and fortification composition in the form of liquid suspension and water dispersible granules can be measured by using the Standard CIPAC Test MT-185 which describes a procedure for the measuring the amount of material retained on the sieve. A sample of the formulation is dispersed in water and the suspension formed is transferred to a sieve and washed. The amount of the material retained on the sieve is determined by drying and weighing.

According to an embodiment, the crop nutrition and fortification composition has a wet sieve retention value on a 75 micron sieve of less than 10%. According to an embodiment, the crop nutrition and fortification composition has a wet sieve retention value on a 75 micron sieve of less than 7%. According to an embodiment, the crop nutrition and fortification composition has a wet sieve retention value on a 75 micron sieve of less than 5%. According to an embodiment, the crop nutrition and fortification composition has a wet sieve retention value on a 75 micron sieve of less than 2%.

According to an embodiment, the crop nutrition and fortification composition in the form of liquid suspension is not highly concentrated and is easily pourable. The viscosity of a fluid is a measure of its resistance to gradual deformation by shear stress or tensile stress.

The viscosity of the liquid suspension is determined by (as per CIPAC MT-192). A sample is transferred to a standard measuring system. The measurement is carried out under different shear conditions and the apparent viscosities are determined. During the test, the temperature of the liquid is kept constant. According to an embodiment, the aqeuous suspension composition has a viscosity at 25° C. of about 10 cps to about 1200 cps, which makes it pourable. According to an embodiment, the aqeuous suspension composition has viscosity at 25° C. of about 10 cps to about 500 cps. According to an embodiment, the aqeuous suspension composition has a viscosity at 25° C. of about less than 500 cps. According to an embodiment, the aqeuous suspension composition has viscosity at 25° C. of about 10 cps to about 400 cps. According to an embodiment, the aqeuous suspension composition has viscosity at 25° C. of about 10 cps to about 300 cps. The crop nutrition and fortification composition having a viscosity in the range of 10 cps-1200 cps makes it pourable. Too viscous and highly concentrated composition tends to form a cake, making it unpourable and thus is undesirable.

According to an embodiment, the crop nutrition and fortification composition in the form of water dispersible granules and liquid suspension demonstrates superior stability in terms of suspensibility under accelared storage condition (ATS). According to an embodiment, the crop nutrition and fortification composition demonstrates suspensibility of more than 90% under ATS. According to an embodiment, the crop nutrition and fortification composition demonstrates suspensibility of more than 80% under ATS. According to an embodiment, the crop nutrition and fortification composition demonstrates suspensibility of more than 70% under ATS. According to an embodiment, the crop nutrition and fortification composition demonstrates suspensibility of more than 60% under ATS. According to an embodiment, the crop nutrition and fortification composition demonstrates suspensibility of more than 50% under ATS. According to an embodiment, the crop nutrition and fortification composition demonstrates suspensibility of more than 40% under ATS. According to an embodiment, the crop nutrition and fortification composition demonstrates suspensibility of more than 30% under ATS.

According to another embodiment, the invention relates to the process for preparing the crop nutrition and fortification composition comprising one or more of boron salts, complexes, derivatives or mixtures thereof, elemental sulphur and at least one dispersing agent in the form of water dispersible granules. The crop nutrition and fortification composition in the form of water dispersible granules is made by various techniques such as spray drying, fluidized bed granulation, extrusion, freeze drying, etc.

According to an embodiment, the process of preparing a water dispersible granular composition involves milling a blend of one or more of boron salts, complexes, derivatives or mixtures thereof in a concentration range of 0.1% to 70% by weight of the total composition; elemental sulphur in a concentration range of 1% to 90% by weight of the total composition and at least one dispersing agent to obtain a slurry or a wet mix. The milling is carried out by using a suitable bead mill or a wet grinding equipment to obtain a particle size in the range of 0.1 to 20 microns. According to an embodiment, the milling step further involves optionally adding one or more agriculturally acceptable excipients to obtain the slurry. According to an embodiment, the blending step can further optionally include an additional active ingredients selected from one or more of fertilizers, micronutrients, macronutrients, bio-stimulants, pesticidal actives or mixtures thereof. The wet mix obtained is then dried to obtain a granule, for instance in a spray dryer, fluid bed dryer or any suitable granulating equipment. The spray drying process is followed by sieving to remove the under sized and the oversized granules to obtain microgranules of the desired size.

According to another embodiment, the crop nutrition and fortification composition in the form of water dispersible granules is also made by dry milling one or more of boron salts, complexes, derivatives or mixtures thereof, elemental sulphur and at least one dispersing agent in an air mill or a jet mill to obtain the desired particle size in the range of 0.1 to 20 microns, preferably 0.1 to 10 microns. Water is added to the dry powder and the mixture is blended to obtain a dough or paste, which is then extruded through an extruder to obtain the granules of desired size.

According to another embodiment, the invention relates to the process for preparing the crop nutrition and fortification composition in the form of liquid suspension. According to further embodiment, the invention relates to a process for preparing the liquid suspension composition comprising one or more of boron salts, complexes, derivatives or mixtures thereof, elemental sulphur, at least one agrochemically acceptable excipients, and at least one structuring agent.

According to an embodiment, the process of preparing the liquid suspension composition involves homogenization of one or more agrochemically acceptable excipients such as surfactants, by feeding them into a vessel provided with stirring facilities. The boron salts, complexes, derivatives or mixtures thereof and elemental sulphur were further added to the homogenized blend and stirred continued for approximately 5 to 10 minutes until the total mixture becomes homogeneous. Subsequently, the liquid suspension obtained is passed through a suitable wet milling equipment to obtain a suspension with a particle size in the range of 0.1 to 20 microns, preferably 0.1 to 10 microns. Then, requisite quantity of the structuring agent is added to the suspension obtained, under continuous homogenization to obtain the liquid suspension composition.

According to an embodiment, the invention further relates to the use of the crop nutrition or fortification composition as at least one of a nutrient composition, a crop strengthener composition, a soil conditioner composition, crop fortification, crop protection and a yield enhancer composition.

According to further embodiment, the invention relates to a method of application of an effective amount of the crop nutrition and fortification composition including one or more of boron salts, complexes, derivatives or mixtures thereof, elemental sulphur and the agrochemical excipient with particles in the size range of 0.1 to 20 microns, wherein the composition is applied to the seeds, seedlings, crops, a plant, plant propagation material, locus, parts thereof or to the surrounding soil.

According to an embodiment, the invention further relates to a method of improving the soil fertility, plant health, improving the crop nutrition by facilitating the uptake of essential nutrients, protecting the plant, enhancing the plant yield, strengthening the plant or conditioning the soil; the method comprising treating at least one of seeds, seedling, crops, a plant, plant propagation material, locus, parts thereof or to the surrounding soil with effective amount of the crop nutrition and fortification composition which include one or more of boron salts, complexes, derivatives or mixtures thereof; elemental sulphur and at least one agrochemically acceptable excipient with particles in the size range of 0.1 to 20 microns.

The composition is applied through a variety of methods. Methods of applying to the soil includes any suitable method, which ensures that the composition penetrates the soil, for example, nursery tray application, in furrow application, drip irrigation, sprinkler irrigation, soil drenching, soil injection, top dressing, broad casting or incorporation into the soil, and such other methods. The composition can also be applied in the form of a foliar spray. The rates of application or the dosage of the composition depends on the type of use, boron and sulphur deficiency level of soil an plants, the type of crops, or the specific active ingredients in the composition but is such that the agrochemical active ingredient, is in an effective amount to provide the desired action (such as nutrient uptake plant vigor, crop yield).

PREPARATION EXAMPLES

The following examples illustrate the basic methodology and versatility of the composition of the invention. It is recognized that changes may be made to the specific parameters and ranges disclosed herein and that there may be a number of different ways known in the art to change the disclosed variables. However, it should be noted that these preparation examples are merely exemplary and are not intended to limit the scope of the invention and whereas it is understood that only the preferred embodiments of these elements are disclosed herein as set forth in the specification and drawings, the invention should not be so limited and should be construed in terms of the spirit and scope of the claims that follow.

A. Water Dispersible Granular Composition of Boron Salts and Elemental Sulphur

Example 1: Water dispersible granular composition of 5% Calcium Borate and 90% elemental sulphur: 90 parts of elemental sulphur, 5 parts of Calcium Borate, 5 parts of naphthalene sulphonate condensate, were blended together to obtain an additive mix. The additive mix obtained was wet milled using a suitable bead mill or a wet grinding equipment to obtain an average particle size of less than 20 microns. The wet milled slurry obtained was then spray dried at an inlet temperature of less than 170 degree C. and an outlet temperature less than 70° C. followed by sieving to remove the under sized and the oversized granules and obtain a water dispersible granular composition of Sulphur 90% and Calcium Borate 5%. The composition had the following particle size distribution: D10 less than 0.9 microns; D50 less than 3.5 microns and D90 less than 12 microns. The composition had almost no hardness. The granule size of the composition is in the range of 0.1-2.0 mm.

The composition has a dispersibility of 88% and a suspensibility of 99%. The composition has a wet sieve retention value of 1%. The composition has a suspensibility of 88% under accelerated storage conditions. The composition also exhibited a wettability of 60 seconds. It is observed that the granules have almost no hardness.

Example 2: Water dispersible granular composition of 70% Zinc borate and 20% elemental sulphur. A water dispersible granular composition was prepared following the process steps as set forth in Example 1 where the composition includes 70 parts of zinc borate, 20 parts of elemental sulphur, 5 parts of phenyl naphthalene sulphonate, 3 parts of sodium lignosulphonate and 2 parts of China clay.

The composition has the following particle size distribution: D10 less than 0.4 microns; D50 less than 4.5 microns and D90 less than 10 microns. The granule size of the composition is in the range of 0.1-2.5 mm.

The composition has a dispersibility of 40% and a suspensibility of 30%. The composition has a wet sieve retention value of 1.5%. The composition has a suspensibility of 25% under accelerated storage conditions. The composition also exhibited a wettability of 120 seconds.

Example 3: Water dispersible granular composition of 25% Calcium Borate and 50% elemental sulphur. A water dispersible granular composition was prepared following the process steps as set forth in Example 1 where the composition includes 25 parts of Calcium Borate, 50 parts of elemental sulphur and 5 parts of naphthalene sulphonate condensate, 8 parts of sodium lignosulphonate and 12 parts of precipitated silica.

The composition has the following particle size distribution: D10 less than 1.5 microns; D50 less than 5 microns and D90 less than 15 microns. The granule size of the composition is in the range of 0.1-0.5 mm.

The composition had a dispersibility of 80% and a suspensibility of 86%. The composition has a wet sieve retention value of 0.7%. The composition has a suspensibility of 80% under accelerated storage conditions. The composition also exhibited a wettability of 20 seconds. It is observed that the granules have almost no hardness.

Example 4: Water dispersible granular composition of 25% Sodium Borate and 60% elemental sulphur. A water dispersible granular composition was prepared following the process steps as set forth in Example 1 where the composition includes 25 parts of sodium borate, 60 parts of elemental sulphur, 9 parts of naphthalene sulphonate condensate, and 6 parts of china clay.

The composition has the following particle size distribution: D10 less than 1.0 microns; D50 less than 3 microns and D90 less than 18 microns. The granule size of the composition is in the range of 0.1-1.5 mm.

The composition has a dispersibility of 55% and a suspensibility of 60%. The composition has a wet sieve retention value of 1.2%. The composition has a suspensibility of 55% under accelerated storage conditions. The composition also exhibited a wettability of 5 seconds.

Example 5: Water dispersible granular composition of 60% Disodium octaborate tetrahydrate, 25% elemental sulphur: A water dispersible granular composition prepared following the process steps as set forth in Example 1, where the composition includes 60 parts of Disodium octaborate tetrahydrate, 25 parts of elemental sulphur, and 10 parts of naphthalene sulphonate condensate, and 5 parts of sodium ligno sulphonate.

The composition has the following particle size distribution: D10 less than 0.6 microns; D50 less than 3.5 microns and D90 less than 9 microns. The granule size of the composition is in the range of 0.1-2.5 mm.

The composition has a dispersibility of 84% and a suspensibility of 92%. The composition has a wet sieve retention value of 0.6%. The composition has a suspensibility of 85% under accelerated storage conditions. The composition also exhibited a wettability of 65 seconds and the granules have almost no hardness.

Example 6: Water dispersible granular composition of 35% Calcium Borate, 10% elemental sulphur and 5% bifenthrin: A water dispersible granular composition was prepared following the process steps as set forth in Example 1 where the composition includes 35 parts of calcium borate, 10 parts of elemental sulphur, 5 parts of bifenthrin, 15 parts of naphthalene sulphonate condensate, 10 parts of sodium lignosulphonate and 25 parts of china clay.

The composition had the following particle size distribution: D10 less than 2 microns; D50 less than 6 microns and D90 less than 18 microns. The granule size of the composition is in the range of 0.1 mm-2.0 mm.

The composition had a dispersibility of 85% and a suspensibility of 85%. The composition has a wet sieve retention value of 0.9%. The composition has a suspensibility of 78% under accelerated storage conditions. The composition also exhibited a wettability of 90 seconds.

B. Liquid Suspension Compositions of Boron Salts and Elemental Sulphur

Example 7: Liquid Suspension composition of 55% Sulphur and 5% Boric acid: Liquid Suspension composition was prepared by mixing 5 parts of Boric acid, 55 parts of Elemental sulphur, 7.1 parts of sodium alkyl naphthalene sulfonate to obtain a blend. The blend was homogenised in water by feeding these ingredients into a vessel equipped with a stirrer to obtain a homogeneous mixture. The mixture obtained was passed through a suitable wet milling equipment to obtain a suspension with particle size of less than 20 microns. Then, 3 parts of gum arabic as structuring agent, was added under continuous homogenization to obtain the liquid suspension composition. The composition comprised 29.9 parts of water. The composition had the following particle size distribution: D10 less than 0.8 microns; D50 less than 4 microns and D90 less than 13 microns.

The sample has a suspensibility of about 98% and a viscosity of about 450 cps. The sample exhibits a suspensibility of 90% under accelerated storage conditions.

Example 8: Liquid Suspension composition of 5% Sulphur, 55% Boron Phosphate: Liquid suspension composition was prepared by following the same process steps as put forth in Example 7, whereby the composition includes 55 parts of Boron phosphate, 5 parts of Elemental sulphur, 8 parts of phenyl naptahlene sulfonate, 4 parts of sodium lignosulphonate, 1 part of formaldehyde, 2.5 parts of carboxymethylcellulose and 24.5 parts of glycerol. The composition had the following particle size distribution: D10 less than 0.5 microns; D50 less than 4.0 microns and D90 less than 12 microns.

The sample has suspensibility of about 30% and a viscosity of about 1200 cps. The sample exhibits a suspensibility of 25% under accelerated storage conditions.

Example 9: Liquid Suspension composition of 10% Sulphur and 50% Zinc borate: Liquid suspension composition was prepared by following the same process steps as put forth in Example 7, whereby the composition included 50 parts of Zinc borate, 10 parts of elemental sulphur, 3 parts of phenyl naphthalene sulphonate, 4 parts of gum arabic and 33 parts of water. The composition had the following particle size distribution: D10 less than 1 microns; D50 less than 3.5 microns and D90 less than 18 microns.

The sample has suspensibility of about 90% and a viscosity of about 250 cps. The sample exhibits a suspensibility of 82% under accelerated storage conditions.

Example 10: Liquid Suspension composition of 60% Sulphur and 5% Disodium octaborate tetrahydrate: Liquid suspension composition was prepared by following the same process steps as put forth in Example 7, whereby the composition included 5 parts of Disodium octaborate tetrahydrate, 60 parts of elemental sulphur, 10 parts of naphthalene sulphonate condensate and 5 parts of sodium lignosulphonate, and 20 parts of propylene glycol. The composition had the following particle size distribution: D10 less than 1.4 microns; D50 less than 5 microns and D90 less than 15 microns.

The sample has suspensibility of about 85% and a viscosity of about 500 cps. The sample exhibits a suspensibility of 80% under accelerated storage conditions.

Example 11: Liquid Suspension composition of 35% Sulphur and 30% Zinc borate: Liquid suspension composition was prepared by following the same process steps as put forth in Example 8, whereby the composition included 30 parts of Zinc Borate, 35 parts of elemental sulphur, 5 parts of naphthalene sulphonate condensate and 5 parts of sodium lignosulphonate, and 25 parts of propylene glycol. The composition had the following particle size distribution: D10 less than 1.4 microns; D50 less than 5 microns and D90 less than 15 microns.

The sample has suspensibility of about 85% and a viscosity of about 500 cps. The sample exhibits a suspensibility of 80% under accelerated storage conditions.

Example 12: Liquid Suspension composition of 30% Sulphur and 35% boron trioxide: Liquid suspension composition was prepared by following the same process steps as put forth in Example 8, whereby the composition included 35 parts of boron trioxide, 30 parts of elemental sulphur, 10 parts of naphthalene sulphonate condensate, 1 part of 1,2-benziosothiazolin-3-one and 1.5 parts of carboxymethylcellulose as the structuring agent and 22.5 parts of water. The composition had the following particle size distribution: D10 less than 1.5 microns; D50 less than 3 microns and D90 less than 16 microns.

The sample has a suspensibility of about 75% and a viscosity of about 650 cps. The sample exhibits a suspensibility of 68% under accelerated storage conditions Example 13: Liquid Suspension composition of 30% Sulphur, 15% Sodium borate and 4% Bifenthrin: Liquid suspension composition was prepared by following the same process steps as put forth in Example 7, whereby the composition included 15 parts of Sodium Borate, 30 parts of elemental sulphur, 4 parts of bifenthrin, 1.5 parts of 1,2-benziosothiazolin-3-one and 0.5 parts of gum arabic and 49 parts of water. The composition has the particle size distribution of about D10 less than 0.3 microns; D50 less than 2.5 microns and D90 less than 10 microns.

The sample has a suspensibility of about 70% and a viscosity of about 400 cps. The sample exhibits a suspensibility of 60% under accelerated storage conditions.

Field Studies

Experiment 1: Field studies were carried out to assess the synergistic effect of the water dispersible granular composition and liquid suspension composition of Sulphur and Calcium borate as per embodiments of the present invention in commercially cultivated Tomato field, in Nashik, Maharashtra.

Field Experiment Methodology:

The experimental site was selected based on tomato crops where the Boron deficiency symptoms were likely to occur, where the soil Boron content was below the deficit level.

The trial was laid out during Kharif season in Randomized Block Design (RBD) with six treatments including untreated control, replicated four times. For each treatment, plot size of 40 sq·m (8 m×5 m) was maintained. The compositions evaluated include Sulphur and Calcium borate alone and different formulations including combinations of sulphur and boron, where sulphur and boron, were applied in each treatment at same dosages. The compositions were applied via bend/side placement just before flowering stage of the tomato crop. The tomato crop in the trial field was raised following good agricultural practices. The seeds of Tomato, variety Veer 2182, were used for the study and planted in 120 cms row to row and 45 cms plant to plant spacing. The details of the experiment are as follows:

Details of Experiment
a) Trial Location: Adgoan, Nasik (MH)
b) Crop: Tomato (var: Veer 2182)
c) Experiment season: Kharif 2018
d) Trial Design: Randomized Block Design
e) Replications: Four
f) Treatment: Six
g) Plot size: 8 m×5 m=40 sq·m
h) Date of Application: 1 Sep. 2018
i) Method of application: Bend/side placement
j) Date of transplanting: 5 Aug. 2018
k) Date of Pickings: 1st—23 Oct. 2018; 2nd—20 Oct. 2018;
3rd—4 Nov. 2018; 4th—10 Nov. 2018
5th—16 Nov. 2018; 6th—22 Nov. 2018

The observations on percentage fruit setting were carried out by tagging newly opened blossoms once a week, and counting the number of tagged blossoms which set fruit one week later. The fruits were harvested six times and weighed each time. The cracked or cat-facing tomatoes were culled out and counted out of 100 fruits. Fifty randomly selected fruits per plot were placed on the table at room temperature (25° C.±2) in well ventilated room and assessed for shelf life. The mean data of all the observations were presented in Table 1 to illustrate the impact of sulphur and Calcium borate alone and their combinations in water dispersible granular form and liquid suspension, both as per the embodiment of the present invention, as well as in pastille form known in the art, on Tomato yield and other parameters.

TABLE 1

To assess the synergistic effect of different formulation of Sulphur and calcium borate in commercial cultivated Tomato field:

| Treatment details | Dose of nutrient salt in g/acre | | Fruit set (%) | Marketable fruit yield (Qtl/acre) | % Fruit yield increases (expected % fruit yield increase) | Crack points (No.) | Shelf life (Days) |
|---|---|---|---|---|---|---|---|
| | Sulphur | Boron | | | | | |
| T1-Untreated | — | — | 71.5$^d$ | 314.8 | — | 17.3 | 7.3 |
| T2-25% Calcium Borate (B-2.272%) water dispersible granules | — | 90.8 | 82.1$^{bc}$ | 348.4 | 10.7 | 8.7 | 10.7 |
| T3- Sulphur 90% water dispersible granules | 2500 | — | 79.4$^c$ | 340.9 | 8.3 | 14.3 | 8.7 |
| T4- 50% Sulphur + 20% Calcium borate (B-1.815%) Pastilles | 2500 | 90.8 | 76.9$^{cd}$ | 339.6 | 7.9 (18.1)* | 10.7 | 10 |
| T5 - 50% Sulphur + 20% Calcium borate (B-1.815%) water dispersible granules as per embodiment of the invention | 2500 | 90.8 | 86.3$^a$ | 381.2 | 21.1 (18.1)* | 5.3 | 13 |

TABLE 1-continued

To assess the synergistic effect of different formulation of Sulphur and calcium borate in commercial cultivated Tomato field:

| Treatment details | Dose of nutrient salt in g/acre | | Fruit set (%) | Marketable fruit yield (Qtl/acre) | % Fruit yield increases (expected % fruit yield increase) | Crack points (No.) | Shelf life (Days) |
|---|---|---|---|---|---|---|---|
| | Sulphur | Boron | | | | | |
| T6- 25% Sulphur + 10% Calcium borate (B-0.907%) SC as per embodiment of the invention | 2500 | 90.8 | 84.1$^{ab}$ | 374.7 | 19.0 (18.1)* | 6 | 12.3 |

*is the percentage yield increase

The boron salt selected and the concentration used is exemplarily and can be replaced with other boron salt with different concentrations as claimed in the present invention.

From the data observed in the table 1, it can be concluded that the compositions T5, T6 as per the embodiments of the present invention demonstrate synergistic behavior.

The percentage yield increase, expected for a combination of two actives such as sulphur and calcium borate was calculated as follows:

$$E = X + Y - (XY/100)$$

Where,

E=Expected % effect by mixture of two products X and Y in a defined dose.

X=Observed % effect by product A (Treatment T2)

Y=Observed % effect by product B (Treatment T1)

The synergy factor (SF) is calculated by Abbott's formula (Eq.(2)(Abbott, 1925).

SF=Observed effect/Expected effect

Where, SF>1 for Synergistic reaction; SF<1 for antagonistic reaction; SF=1 for additive reaction.

When the percentage yield increase observed for the combination is equal to the expected percentage, merely an additive effect may be inferred, and wherein the percentage yield increase observed for the combination is lower than the expected percentage, an antagonistic effect of the combinations can be inferred. The term "synergy" is defined by Colby S. R. in an article entitled "*Calculation of the synergistic and antagonistic responses of herbicide combinations*" published in Weeds, 1967, 15, p. 20-22. When the percentage of yield effect observed (E) for the combination is greater than the expected percentage, synergistic effect of the combination can be inferred.

Based on the data and the calculations made, the expected percentage increase in the fruit yield was found to be 18.1%. It can be clearly seen from the Table 1 above, that the treatment T5 with Sulphur 50%+20% Calcium borate (B-1.815%) water dispersible granular composition, as per the embodiment of the present invention showed a 21.1% yield increase in tomato fruit, and treatment T6 with Sulphur 25%+10% Calcium borate (B-0.907%) suspension concentrate, as per the embodiment of the present invention showed a 19% increase in the yield of tomato.

However, treatment T4 with 50% Sulphur+20% Calcium borate (B-1.815%) pastilles demonstrated only a 7.9% increase in the yield of tomato fruits. Thus, the treatments T5 and T6 with water dispersible granules and liquid suspension compositions, respectively, as per the embodiments of the present invention demonstrated a synergistic effect, as compared to the treatment with individual actives or with pastille compositions. The results are all the more surprising as all the treatments T4 to T6 had the same dosage of Sulphur and boron being applied to the soil i.e. 2500 gms/acre of Sulphur and 90.8 gms/acre of boron.

Treatments T5 and T6 exhibited highest fruit yield of about 381.2 quintals/acre and 374.7 quintals/acre respectively when compared to treatment T4 with a fruit yield of 339.6 quintals/acre, Treatment T2 with Calcium borate water dispersible granules (fruit yield –348.4 quintals/acre), sulphur 90% WDG treatment (fruit yield –340.9 quintals/acre).

It can be further seen from the Table 1, that treatments T5 and T6 with compositions as per the embodiment of the present invention, showed a surprising reduction in the fruit crack points and also demonstrated an enhanced shelf life, as compared to treatments T2 and T3, respectively, with Calcium borate and Sulphur used individually, as well as when compared to Treatment T4 with 50% Sulphur+20% Calcium borate (B-1.815%) pastilles, where Sulphur and boron are applied at same dosages of application in each treatment. Thus, the combination of sulphur and boron salt in the form of a water dispersible granule and suspension concentrate, both as per the embodiments of the present invention, are synergisitic in nature and showed a surprising enhancement in the yield as well as improved plant physiological parameters.

The compositions as per the embodiment of the present invention showed increased greenness and improved fruit size and colour in tomato, as compared to treatments with individual application of actives or as compared to pastille compositions of Sulphur and Calcium borate.

Experiment 2: Field trials were carried out to study the impact of different salts of Sulphur (S)+Boron namely, calcium borate, boron trioxide and boron phosphate, in different formulations, including compositions, as per the embodiments of the present invention, at different concentration, on the Sulphur and Boron uptake in the leaves, the total soluble solids (Brix), average fruit weight, plant dry weight and marketable fruit yield in commercially cultivated Tomato field at Idar, Gujarat.

The trials were laid out during the kharif season in Randomized Block Design (RBD) with ten treatments including untreated control, replicated thrice. For each treatment, plot size of 40 sq·m (8 m×5 m) was maintained. The compositions of Sulphur and various salts in different forms and varying concentrations, at prescribed dose were applied as side/bend placement application at the time of flowering of Tomato crop. The Tomato crop in the trial field was raised following good agricultural practices. The seed of Tomato, variety Avinash, were used for the study and planted in 120 cm row to row and 45 cm plant to plant spacing.

Details of Experiment
a) Trial Location: Idar, Gujarat
b) Crop: Tomato (var: Avinash)
c) Experiment season: Kharif 2018
d) Trial Design: Randomized Block Design
e) Replications: Three
f) Treatment: Ten
g) Plot size: 8 m×5 m=40 sq·m
h) R×P spacing: 120 cm×45 cm
h) Date of transplanting: 27 Jul. 2018
i) Date of Application: 20 Aug. 2018
j) Method of application: Side/bend placement
k) Date of Harvesting: 1st—3 Oct. 2018; 2nd—11 Oct. 2018;
3rd—16 Oct. 2018; 4th—22 Oct. 2018
5th—28 Oct. 2018; 6th—4 Oct. 2018

The observation on the Sulphur and Boron nutrient content in the leaves was carried out by collecting the leaf samples from tomato plant from 4 top leaves after 20 days of treatment application. The Sulphur and Boron uptake concentration was analyzed in the laboratory, using the prescribed methodology. Total soluble solids (TSS) and average fruit weight was analyzed at the time of $2^{nd}$ picking from 10 fruits in each plots and mean of 10 fruits were presented in Table 2. Plant dry weight was measured at the time of last picking, while fruits were harvested six times and weighed each time. The mean data of all the observations was presented in Table 2 to enumerate the impact of the combination of sulphur and boron and in different formulations and varying concentrations, on Tomato yield and other parameters.

TABLE 2

Effect of sulphur and Boron salt combinations in different formulations and varying concentrations on Tomato crop:

| Treatment details | Dose of nutrient salt in g/acre | | Nutrient concentration | | Total Soluble solids | Plant dry wt | Av. Fruit wt | Marketable fruit yield |
|---|---|---|---|---|---|---|---|---|
| | Sulphur | Boron | Sulphur (g/kg) | Boron (mg/kg) | (Brix) | (g) | (g) | (qtl/acre) |
| T1-Sulphur 50% + Boron 1.533 (Boron phosphate 15%) water dispersible granules as per embodiment of the invention | 2500 | 76.65 | 12.17 | 37.34 | 4.41 | 409.1 | 98.3 | 283.4 (11.0)* |
| T2-Sulphur 30% + Boron 1.815% (Calcium Borate 20%) water dispersible granules as per embodiment of the invention | 1500 | 90.75 | 10.06 | 44.82 | 4.72 | 434.5 | 104.5 | 295.2 (15.6)* |
| T3-Sulphur 55% + Boron 6.212% (Boron trioxide 20%) water dispersible granules as per embodiment of the invention | 1100 | 124.24 | 8.75 | 52.33 | 4.64 | 412.7 | 103.2 | 288.7 (13.1)* |
| T4- Sulphur 50% + Boron 1.533 (Boron phosphate 15%) Pastilles | 2500 | 76.65 | 6.64 | 21.51 | 3.78 | 391.2 | 91.6 | 259.1 (1.5)* |
| T5- Sulphur 30% + Boron 1.815% (Calcium Borate 20%) Pastilles | 1500 | 90.75 | 4.08 | 24.64 | 3.94 | 384.9 | 93.2 | 263.7 (3.3)* |
| T6- Sulphur 55% + Boron 6.212% (Boron trioxide 20%) Pastilles | 1100 | 124.24 | 4.96 | 27.38 | 3.91 | 396.1 | 92.6 | 264.2 (3.5)* |
| T7- Sulphur 25% + Boron 0.766 (Boron phosphate 7.5%) SC as per embodiment of the invention | 2500 | 76.65 | 11.52 | 38.07 | 4.29 | 411.5 | 102.5 | 278.9 (9.2)* |
| T8-Sulphur 15% + Boron 0.907% (Calcium Borate 10%) SC as per embodiment of the invention | 1500 | 90.75 | 10.34 | 41.44 | 4.6 | 439.3 | 103.1 | 285.6 (11.9)* |

TABLE 2-continued

Effect of sulphur and Boron salt combinations in different formulations and varying concentrations on Tomato crop:

| Treatment details | Dose of nutrient salt in g/acre | | Nutrient concentration | | Total Soluble solids (Brix) | Plant dry wt (g) | Av. Fruit wt (g) | Marketable fruit yield (qtl/acre) |
|---|---|---|---|---|---|---|---|---|
| | Sulphur | Boron | Sulphur (g/kg) | Boron (mg/kg) | | | | |
| T9- Sulphur 27.5% + Boron 3.106% (Boron trioxide 10%) SC as per embodiment of the invention | 1100 | 124.24 | 8.29 | 49.35 | 4.61 | 402.4 | 97.8 | 281.5 (10.3)* |
| T10-Untreated | — | — | 3.14 | 17.1 | 3.07 | 362.2 | 88.3 | 255.3 (—) |
| CD (at 0.5%) | — | — | 1.92 | 8.72 | 0.47 | 24.31 | 7.32 | 23.33 |

It was observed from the table 2 that Treatments T1, T2 and T3 with different boron salts in varying concentrations of sulphur and boron salts in the water dispersible granular forms, as per the embodiment of the present invention, showed a 11%, 15.6% and 13.1% increase, respectively, in the tomato fruit yield, as compared to the untreated plants. Furthermore, the Treatments T7, T8 and T9 with varying concentrations of sulphur and boron salts in the suspension concentrate form, as per the embodiment of the present invention showed 9.2%, 11.9% and 10.3% increase, respectively, in the fruit yield of tomato over the untreated control. On the other hand, it was observed that treatment with varying concentrations of Sulphur plus boron salts in the pastille form (Treatments T4, T5 and T6), known in the art, showed only a 1.5%, 3.3% and 3.5% increase, respectively, over the untreated control, in the fruit yield in tomato crop.

It was also observed that treatments T1, T2, T3, T7, T8 and T9, with compositions, as per the embodiments of the present invention, showed a surprisingly significant increase in the sulphur and boron content in tomato, as well as a significant increase in the plant dry weight and the average fruit weight in tomato over the untreated control, or in comparison to treatment with Sulphur plus boron in the pastille form (Treatments T4, T5 and T6), known in the art, at same dosage of application of the actives.

Further, on comparing treatments T1, T4, T7 it was observed that treatment T1 and T7 with water dispersible granular compositions and suspension concentrate compositions of sulphur and boron phosphate, as per the embodiment of the present invention, demonstrated a yield increase in tomato of about 11% and 9% respectively, whereas treatment T4 with pastille composition of sulphur and boron phosphate, demonstrated a yield increase of only 1.5%, over the untreated control. The boron uptake with respect to the treatments T1, T7, with the compositions as per the present invention, was about 37.34 mg/kg and 38.07 mg/kg respectively whereas with the treatment T4 with the pastille compositions of sulphur and boron phosphate, the boron uptake was only about 21.51 mg/kg. The results are surprising as the amount of sulphur and boron being applied in each of the treatments T1, T4 and T7 was the same i.e. 2500 gms/acre of sulphur and 76.65 gms/acre of boron.

It was also observed that the sulphur uptake with the compositions of Treatment T1 and T7, with sulphur and boron phosphate, as per the embodiments of the present invention, was about 12.17 g/kg and 11.52 g/kg respectively whereas with T4 (pastille composition), the sulphur uptake was found to be only about 6.64 g/kg.

Further, on comparing treatment T2, T5, T8 it was observed that treatment T2, T8, respectively, with Sulphur and Calcium borate, in the water dispersible granular forms and the suspension concentrate form, both as per the embodiment of the present invention showed a yield increase of 15.6% and 11.9%, respectively, over the untreated control, whereas treatment T5 (pastille composition of Sulphur and Calcium borate) showed a yield increase of only 3.3%.

It was furthermore observed that the uptake of calcium was also enhanced with the application of treatments T2, T8, respectively, with Sulphur and Calcium borate, in the water dispersible granular forms and the suspension concentrate form, both as per the present invention as compared to treatment T5 with the pastille composition of Sulphur and Calcium borate.

The boron uptake with respect to the Treatments T2 and T8 with compositions as per the present invention, was found to be 44.82 and 41.44 mg/kg, respectively, whereas treatment T5 (pastille composition of Sulphur and Calcium borate) depicted boron uptake of only 24.64 mg/kg. Further Treatments T2 and T8 also showed a higher sulphur uptake as compared to the treatment with the pastille composition. Further Treatments T3 and T9 with Sulphur and Boron trioxide water dispersible granules and suspension concentration compositions, both as per the embodiment of the present invention also showed enhanced boron and sulphur uptake by the plants as compared to treatment T6 with pastille compositions of sulphur and boron trioxide. The results are all the more surprising as each of the comparative treatments for instance T1, T4 and T7 or T2, T5 and T8 or T3, T6 and T9 had the same dosage of sulphur and boron being applied.

Thus, composition of sulphur and boron salts at different concentration in the form of water dispersible granules and suspension concentrates, as per the present invention, demonstrated significantly higher yield and nutrient uptake in tomato, as compared to the composition in the pastille form.

It was observed that apart from the boron salts listed in the Table above, other boron salts as claimed in the present application also showed a synergistic effect in combination with elemental sulfur at the claimed concentration ranges of the present invention.

Experiment No 3: Field Studies were carried out to assess the synergistic effect of different formulations of Sulphur and Zinc borate applied individually and in combination in the water dispersible granular form and as liquid suspension as per the invention, as well as in the form of pastilles, in commercially cultivated Grape field at Adgoan, Nasik (MH).

Field Experiment Methodology

The trials were laid out during the Rabi season in Randomized Block Design (RBD) with six treatments including untreated control, replicated four times. For each treatment, six vines plants were maintained. The compositions evaluated include Sulphur and Zinc borate alone and in different formulations and varying concentrations, applied as side/bend placement application method, immediately after forward pruning. The Grape vine plants in trial field were raised following good agricultural practice. The 5 year old Grape vines, variety Thomson seedless, were used for the study.

Details of Experiment
a) Trial Location: Adgoan, Nasik (MH)
b) Crop: Grape (var: Thomson seedless)
c) Experiment season: October 2018 to February 2019
d) Trial Design: Randomized Block Design
e) Replications: Four
f) Treatment: Six
g) Plot size: 2.4 m×9 m=21.6 sq·m
h) Date of Pruning: 2 Oct. 2018
i) Date of Application: 4 Oct. 2018
j) Method of application: Bend/side placement
k) Date of Harvesting: 8 Mar. 2019

The observations on fruit size, bunch weight sugar contents in berries and the fruit yield of grape were recorded at the harvesting time and the mean data was presented in Table 5 to enumerate the impact of the combination of sulphur and Zinc borate alone and its combination in different formulation and concentrations on commercially cultivated grape yield.

TABLE 3

Efficacy of Sulphur and Zinc borate on Grapes

| Treatment details | Dose of nutrient salt in g/acre | | Fruit size (mm) | Bunch wt (g) | Sugar content in berries (g/dm3) | Fruit yield (qtl/acre) | % fruit yield increases over untreated | Expected % fruit yield increase (synergy factor) |
|---|---|---|---|---|---|---|---|---|
| | Sulphur | Boron | | | | | | |
| T1-Untreated | — | — | 15.6 | 730.5 | 18.1 | 140.4 | — | — |
| T2-25% Zinc Borate (B-1.723%) water dispersible granules | | 110.24 | 16.4 | 840.2 | 19.5 | 151.3 | 7.8 | — |
| T3- Sulphur 90% water dispersible granules | 1600 | — | 16.5 | 835.7 | 19.6 | 152.7 | 8.8 | — |
| T4- 40% Sulphur + 40% Zinc borate (B-2.756%) Pastilles | 1600 | 110.24 | 16.5 | 845.6 | 19.4 | 155.8 | 11 | 15.9 (0.69)* |
| T5 - 40% Sulphur + 40% Zinc borate (B-2.756%) water dispersible granules as per embodiment of the invention | 1600 | 110.24 | 16.9 | 910.4 | 20.2 | 164.7 | 17.3 | 15.9 (1.09)* |
| T6- 20% Sulphur + 20% Zinc borate (B-1.378%) SC as per embodiment of the invention | 1600 | 110.24 | 16.8 | 895.8 | 19.9 | 162.9 | 16 | 15.9 (1.01)* |

*Synergistic effect

It can be observed from the above table that treatment T5 (40% Sulphur+40% Zinc borate (B-2.756%) water dispersible granules and Treatment T6 with 20% Sulphur+20% Zinc borate (B-1.378%) SC composition, both as per the present invention, demonstrated a fruit yield increase of about 17.3% and 16% respectively, over the untreated control, whereas treatment T4 (40% Sulphur+40% Zinc borate (B-2.756%) pastilles demonstrated yield increase of only 11%.

The expected yield increase for all the treatments applied was found to be 15.9%. Thus, on comparing the treatments set forth in the above table, it was noted that Sulphur and boron salt in the form of water dispersible granules and suspension concentrate form, as per the present invention exhibited synergy and a significant enhancement in yield, as compared to the combination of Sulphur and boron salt in pastille form.

It was further observed that the grape fruit bunch weight and the sugar content in the grape berries was found to be significantly higher with the compositions of treatments T5 and T6, as per the embodiments of the present invention, over the untreated control or as compared to the pastille compositions of treatment T4.

Thus, it indicates that a composition of Sulphur and Zinc borate in the form of a water dispersible granular and suspension concentrate compositions prepared according to the embodiments of the present invention demonstrated significant enhancement in yield and other plant parameters while being required to be applied at low doses to meet the sulphur and boron nutrient requirements of the plant.

Experiment 4: Field Studies were also carried out to assess the impact of different formulation of various salts Sulphur and boron in varying concentrations, including compositions as per the embodiment of the present invention, on the yield and yield attributing parameters in commercially cultivated grape field at Nasik, Maharashtra The field trials were carried out to study the effect of different formulations of Sulphur and boron salts such Zinc borate, Calcium borate and Disodium octaborate tetrahydrate combinations in varying concentrations, including compositions, as per the embodiment of the present invention, on the yield and quality parameters of grapes. The trial was laid out during the rabi season in Randomized Block Design (RBD) with ten treatments including untreated control, replicated thrice. For each treatment, six grape vine bush were maintained. The test samples of Sulphur and Zinc borate combination with prescribed dose were applied as side/bend placement application method, immediately after forward pruning of grape vines. The Grape vines in trial field were raised following good agricultural practice. The Grape vine, variety Thomson seedless, was used for the study.

Details of Experiment
a) Trial Location: Pimpalgoan, Nasik (Maharashtra)
b) Crop: Grape (var: Thomson seedless)
c) Experiment season: October 2018 to March 2019
d) Trial Design: Randomized Block Design
e) Replications: Three
f) Treatment: Ten
g) Number of plants/treatment: Six grape vine bushes
h) Plot size: 2.4 m×9 m=21.6 sq·m
h) Date of sowing: 14 Oct. 2018
i) Date of Application: 16 Oct. 2018
j) Method of application: Bend/side placement
k) Date of Harvesting: 15 Oct. 2019

TABLE 4

Efficacy of Sulphur (S) and various boron salts in different concentrations on the grape yield and yield attributing factors

| Treatment details | Dose of nutrient salt in g/acre | | Nutrient concentration | | Sugar content in berries | Fruit yield |
|---|---|---|---|---|---|---|
| | Sulphur | Boron | Sulphur (g/kg) | Boron (mg/kg) | (g/dm3) | (qtl/acre) |
| T1- Sulphur-75% + Boron-2.515 (Disodium octaborate tetrahydrate 12%) WDG as per embodiment of the invention | 3000 | 100.6 | 9.23 | 31.22 | 20.03 | 130.3 (13.8)* |
| T2-Sulphur 50% + Boron 2.27% (Calcium borate 25%) WDG as per embodiment of the invention | 2000 | 90.8 | 9.82 | 34.82 | 20.5 | 134.8 (17.7)* |
| T3-Sulphur 40% + Boron 2.757% (Zinc Borate 40%) WDG as per embodiment of the invention | 1600 | 110.28 | 8.72 | 30.67 | 19.78 | 132.9 (16.1)* |
| T4- Sulphur 75% + Boron 2.515 (Disodium octaborate tetrahydrate 12%) Pastilles | 3000 | 100.6 | 3.77 | 19.52 | 16.95 | 119.3 (4.2)* |
| T5- Sulphur 50% + Boron 2.27% (Calcium Borate 25%) Pastilles | 2000 | 90.8 | 4.11 | 20.31 | 17.22 | 123.1 (7.5)* |

TABLE 4-continued

Efficacy of Sulphur (S) and various boron salts in different concentrations on the grape yield and yield attributing factors

| Treatment details | Dose of nutrient salt in g/acre | | Nutrient concentration | | Sugar content in berries (g/dm3) | Fruit yield (qtl/acre) |
|---|---|---|---|---|---|---|
| | Sulphur | Boron | Sulphur (g/kg) | Boron (mg/kg) | | |
| T6- Sulphur 40% + Boron 2.757% (Zinc Borate 40%) Pastilles | 1600 | 110.28 | 4.01 | 18.45 | 17.13 | 120.5 (5.2)* |
| T7- Sulphur-37.5% + Boron 1.257 (Disodium octaborate tetrahydrate 6%) SC as per embodiment of the invention | 3000 | 100.6 | 8.72 | 29.53 | 19.55 | 131.5 (14.8)* |
| T8- Sulphur 25% + Boron 1.135% (Calcium Borate 12.5%) SC as per embodiment of the invention | 2000 | 90.8 | 9.5 | 30.04 | 19.98 | 132.7 (15.9)* |
| T9 - Sulphur 20% + Boron 1.378% (Zinc Borate 20%) SC as per embodiment of the invention | 1600 | 110.28 | 9.23 | 30.31 | 19.74 | 129.3 (12.9)* |
| T10-Untreated | — | — | 2.83 | 14.12 | 16.01 | 114.5 (—) |
| CD (at 0.5%) | — | — | 1.24 | 5.78 | 2.44 | 5.92 |

*% increase or decrease over control

It was observed from the table 4 that Treatments T1, T2 and T3 with varying concentrations of sulphur and boron in the water dispersible granular forms, as per the embodiment of the present invention, showed a significant increase, in the fruit yield of grape plants, as compared to the untreated plants. Furthermore, the Treatments T7, T8 and T9 with varying concentrations of sulphur and boron in liquid suspension form, as per the present invention showed an enhanced increase in the fruit yield as compared to the untreated control.

On comparing treatment T1, T4, T7 it was observed that treatments T1 and T7, both with the compositions of Sulphur and disodium octaborate tetrahydrate, as per the present invention, demonstrated a yield increase of about 13.8% and 14.8% respectively, over the untreated control, whereas treatment T4 with pastille composition of Sulphur and disodium octaborate tetrahydrate demonstrated a yield increase of only 4.2% over the untreated control. The sulphur uptake with respect to treatment T1, T7 with the compositions as per the present invention, was about 9.23 g/kg and 8.72 g/kg respectively, whereas with treatment T4 (pastille composition), the sulphur uptake was only 3.77 g/kg.

Further, the boron uptake observed with treatment T1, T7 with water dispersible granules and suspension concentration as per the present invention, was about 31.22 g/kg and 29.53 g/kg respectively whereas with treatment T4 with pastille composition, the boron uptake was observed to be only about 19.52 g/kg.

Furthermore, on comparing treatment T2, T5, T8 it was observed that treatment T2, T8 (with compositions as per the present invention) demonstrated a yield increase of about 17.7% and 15.9%, whereas with treatment T5 with the pastille composition, the yield increase was only 7.5% over the untreated control. The sulphur uptake with respect to treatment T2, T8 with water dispersible granules and suspension concentration as per the present invention, was about 9.82, 9.5 g/kg respectively whereas with treatment T5 it was only about 4.11 g/kg. Also, the boron uptake observed with treatment T2, T8 was about 34.82 g/kg and 30.04 g/Kg respectively whereas with treatment T5 it was about 20.31 g/kg.

Moreover, treatments T3 and T9 with compositions as per the present invention showed a yield increase of 10.1% and 12.9% as compared to the pastille composition of Treatment T6, which showed a yield increase of only 5.2%.

Furthermore the treatments T1 to T3 and treatments T7 to T9, with compositions as per the embodiments of the invention also showed an increased sugar content in the berries as compared to treatment with pastille compositions.

The treatments T2 and T8 with Sulphur and Calcium borate water dispersible granules and suspension concentrate, respectively, both as per the embodiment of the invention, also showed an enhancement in calcium uptake by the plants as compared to the treatment T5 with the pastille composition. Further the treatments T3 and T9 with Sulphur and Zinc borate water dispersible granules and suspension concentrate, respectively, both as per the embodiment of the invention, exhibited an enhancement in zinc uptake by the plants as compared to the treatment T6 with the pastille composition.

The results are all the more surprising as each of the comparative treatments for instance T1 and T7 (compositions of present invention), with T4 (pastille composition) or T2 and T8 (compositions of present invention), with T5 (pastille composition) or T3 and T9 (compositions of present invention) with T6 (pastille composition) had the same dosage of sulphur and boron being applied.

Thus, sulphur and boron salts in water dispersible granular form and suspension concentrate form, as per the embodiments of the present invention demonstrated significantly higher yield, boron and sulfur uptake and thereby synergy as compared to composition of sulphur and boron salt in the form of pastilles.

Experiment 5:

Field trials were carried out to study the impact of different formulations of 50% Sulphur+25% Calcium borate (B-2.272%) combinations on availability of Sulphur and Boron nutrients in the soil.

Pot Trial Experiment Methodology:

The pot trials experiment were carried out to see the effect of different formulation 50% Sulphur+25% Calcium borate (B-2.272%) combination for Sulphur and Boron nutrient availability, in soil over a period of time.

The earthen pots were field with two kilogram sandy loam soil and kept in five sets to draw the samples at 3, 20, 40, 60 and 80 days with three treatment and three replications. Samples from three different formulation of Sulphur and Calcium borate combination i.e. T1-50% Sulphur+25% Calcium borate (B-2.272%) pastilles, T2-50% Sulphur+25% Calcium borate (B-2.272%) water dispersible granules and T3-50% Sulphur+25% Calcium borate (B-2.272%) SC; were measured 2 gms each, for each treatment, replication wise and poured into respective treatment pots and mixed well. The experimental pots were kept at 25° C. temperature and sufficient moisture was maintained during entire experiment. The 100 g samples from first set of the treatment (i.e. 3 days after treatment) was drawn for assessment of the Sulphur and Boron availability in the soil at 3 days and similarly soil samples was drawn at 20 days, 40 days, 60 days and 80 days from 2, 3, 4 and $5^{th}$ sets of pots respectively.

The comparative availability of Sulphur and Boron nutrient from different treatments was assessed and presented into graphs 1 and 2 to evaluate the sulphur and boron nutrient availability status, over a period of time.

It can be seen from the graphs in FIG. 1A and FIG. 1B that treatments T2 with 50% Sulphur+25% Calcium borate (B-2.272%) water dispersible granules as per the present invention and treatment T3 with 50% Sulphur+25% Calcium borate (B-2.272%) suspension concentrate as per the present invention showed a significantly enhanced uptake of boron and sulphur in the soil samples as compared to Treatment T1 with 50% Sulphur+25% Calcium borate (B-2.272%) Pastilles known in the art. It is noted that sulphur and boron are made immediately available to the crops whereas pastilles comparatively takes time to meet the nutritional requirement of the crop. It can be observed from FIGS. 1 and 2 that sulphur and boron were available for uptake immediately after application in the form of water dispersible granules or suspension concentrate composition whereas very little amount of Sulphur and boron, was released from pastilles after 3 days of application.

Experiment 6: Field studies were carried out to study the impact of different formulation of Sulphur plus Calcium borate on yellow rust (caused by *Puccinia striiformis* Westend var. *tritici*) control in wheat.

Field Experiment Methodology:

The field trial was carried out to see the effect of different formulations of Sulphur+Calcium borate on yellow rust (caused by *Puccinia striiformis* Westend var. *tritici*) control in wheat at Karnal, Haryana. The trial was laid out during Rabi season in Randomized Block Design (RBD) with six treatments including untreated control, replicated four times. For each treatment, plot size of 30 sq·m (6 m×5 m) was maintained. The test product compounds, Sulphur and Calcium borate alone and its combination in different formulations with prescribed dose were applied to the soil at the time of $1^{st}$ irrigation of wheat (25 days after sowing). The wheat crop in trial field was raised following good agricultural practices. The seed of yellow rust susceptible wheat, variety PBW 343, were used for the study and planted in 30 cms row to row and 10 cm plant to plant spacing. The yellow rust inoculum was sprayed on wheat crop in entire treatment plots including untreated plots at mid-January for uniform disease development.

Details of Experiment
a) Trial Location: Karnal, Haryana
b) Crop: Wheat (var: PBW 343)
c) Experiment season: Rabi 2018
d) Trial Design: Randomized Block Design
e) Replications: Four
f) Treatment: Six
g) Plot size: 6 m×5 m=30 sq·m
h) Date of sowing: 4 Nov. 2018
i) Date of Application: 30 Nov. 2018
j) Method of application: Soil application
k) Date of Harvesting: 19 Apr. 2019

The observation on disease severity of yellow rust disease was recorded in percentage using modified Cobb's 0-9 rating scale (Peterson et al., 1948) on regularly interval on 50, 75 and 100 days after application of treatments.

The mean data of plant mortality and percent disease control is presented in Table 5.

$$\text{Disease control (\%)} = \frac{(C - T)}{C} * 100$$

Where C=Disease incidence in Control; T=Disease incidence in treatment

The treatments evaluated to assess the effect of different combinations and formulations of Sulphur+Calcium borate in Wheat against yellow rust disease are as set forth in Table 5:

TABLE 5

| Treatment details | Dose of nutrient salt in g/acre | | Percentage disease incidence (PDI) | | | % Disease control |
|---|---|---|---|---|---|---|
| | Sulphur | Boron | 50 DAT | 75 DAT | 100 DAT | |
| T1-Untreated | — | — | 0.78 | 7.91 | 32.14 | — |
| T2-25% Calcium Borate WG | — | 90.8 | 0.21 | 5.67 | 27.36 | 14.9 |
| T3-Sulphur 90% WDG | 2000 | — | 0.32 | 4.44 | 25.40 | 21.0 |
| T4- 50% Sulphur + 25% Calcium borate (B-2.272%) Pastilles | 2000 | 90.8 | 0.0 | 6.34 | 29.12 | 9.4 |

TABLE 5-continued

| Treatment details | Dose of nutrient salt in g/acre | | Percentage disease incidence (PDI) | | | % Disease control |
|---|---|---|---|---|---|---|
| | Sulphur | Boron | 50 DAT | 75 DAT | 100 DAT | |
| T5 - 50% Sulphur + 25% Calcium borate (B-2.272%) water dispersible granules (as per embodiment of present invention) | 2000 | 90.8 | 0.0 | 3.12 | 22.67 | 29.5 |
| T6- 25% Sulphur + 12.5% Calcium borate (B-1.81%) suspension concentrate (as per embodiment of present invention) | 2000 | 90.8 | 0.0 | 3.32 | 21.52 | 33.0 |
| CD at 0.05% | — | — | — | — | — | — |

DAT = Days after treatments;
*Mean of four replications

It can be seen from the above table that the percentage disease control of yellow rust in wheat was found to be significant with the compositions of Treatments T5 and T6 as per the embodiments of the present invention as compared to the untreated control as compared to treatment with individual actives applied at same dosages of application. It can be seen that Treatment 5 with 50% Sulphur+25% Calcium borate (B-2.272%) water dispersible granules (as per embodiment of present invention) and Treatment 6 with 25% Sulphur+12.5% Calcium borate (B-1.81%) suspension concentrate (as per embodiment of present invention) showed a 29.5% and 33%, disease control respectively as compared to the untreated control or as compared to treatment T2 or T3 with individual actives, where in fact all the treatments T2, T3, T5 and T6, the total amount of actives being applied were the same. In fact, it was seen that Treatments T4 with 50% Sulphur+25% Calcium borate (B-2.272%) Pastilles showed a disease control of only 9.4% as compared to treatments with T5 and T6, where compositions as per the embodiment of the present invention were being applied.

Experiment 7: Field studies were carried out to assess the impact of the different range of particle size of composition of Sulphur (S)+Zinc borate (B) on yield of Cauliflower Field Experiment Methodology The field trials were carried out to see the effect of different range of particle size of composition of Sulphur (S)+Zinc (B) on yield of yield of Cauliflower at Nasik, Maharashtra.

The trial was laid out during spring season in Randomized Black Design (RBD) with five treatments including untreated control, replicated four times. For each treatments, plot size of 30 sq·m (6 m×5 m) was maintained. The test products with prescribed dose were applied by drip irrigation at 15 days after transplanting of Cauliflower. The Cauliflower crop in trial field was raise followed good agricultural practice. The seed of Cauliflower, variety GS 277, were used for sowing in 50 cm row to row and 30 cm plant to plant spacing.

Details of Experiment
a) Trial Location: Nasik, Maharashtra
b) Crop: Cauliflower (var: GS 277)
c) Experiment season: Spring-March to May
d) Trial Design: Randomized Block Design
e) Replications: Four
f) Treatment: 5
g) Plot size: 6 m×5 m=30 sq·m
h) Date of transplanting: 3 Mar. 2019
i) Date of Application: 17 Mar. 2019
j) Method of application: Drip irrigation
k) Date of Harvesting: 16 May 2019

The observation on yield was recorded at the time of harvesting and the mean data is presented in table 6 to see the impact of different treatment on yield of Cauliflower.

TABLE 6

| Treatment details | Range of particle size of composition | Formulation dose (kg/acre) | Dose of nutrient salt in g/acre | | Average Curd weight (g) | Yield (qtl/acre) | % Yield increase over untreated |
|---|---|---|---|---|---|---|---|
| | | | S | B | | | |
| T1- Untreated | — | — | — | — | 870.3 | 61.3 | — |
| T2- 50% Sulphur + 35% Zinc borate (B-2.41%) WDG | 0.1 to 20 microns | 4.0 | 2000 | 96.4 | 1102.5 | 77.5 | 26.4 |
| T3- 50% Sulphur + 35% Zinc borate (B-2.41%) WDG | 0.1 to 50 microns | 4.0 | 2000 | 96.4 | 1030.7 | 71.2 | 16.2 |
| T4- 50% Sulphur + 35% Zinc borate (B-2.41%) WDG | 20 to 50 microns | 4.0 | 2000 | 96.4 | 1015.4 | 70.8 | 15.5 |

TABLE 6-continued

| Treatment details | Range of particle size of composition | Formulation dose (kg/acre) | Dose of nutrient salt in g/acre | | Average Curd weight (g) | Yield (qtl/acre) | % Yield increase over untreated |
|---|---|---|---|---|---|---|---|
| | | | S | B | | | |
| T5- 50% Sulphur + 35% Zinc borate (B-2.41%) WDG | 50 to 100 microns | 4.0 | 2000 | 96.4 | 945.6 | 68.5 | 11.7 |
| CD (P > 0.05) | — | — | — | — | 70.5 | 4.12 | |

It can be seen from the data presented in Table 6 that Treatment T2 (water dispersible granular composition of 50% Sulphur+35% Zinc borate (B-2.41%), with particle size in the range of 0.1 micron to 20 microns, as per the embodiment of the present invention showed a significant increase in the yield and the average curd weight in cauliflower, when compared to treatment T3 with 50% Sulphur+35% Zinc borate (B-2.41%) water dispersible granules, having particle size in the range of 0.1 to 50 microns, T4 with 50% Sulphur+35% Zinc borate (B-2.41%) water dispersible granules having particle size in the range of 20 to 50 microns and T5 with 50% Sulphur+35% Zinc borate (B-2.41%) water dispersible granules having particle size in the range of 50 to 100 microns. It was observed that the Treatment T2 with composition as per the present invention showed a surprisingly significant 26.4% increase in the cauliflower yield as compared to the untreated control whereas the treatments T3, T4 and T5 only showed a yield increase of 16.2%, 15.5% and 11.7%, respectively as compared to the untreated control. It was noted that the superior efficacy was observed with the water dispersible granular formulation as per the present invention, where the composition comprised particles in the size range of 0.1 micron-20 microns, as compared to water dispersible granular formulations with higher particle size ranges.

Experiment 8: Field studies were carried out to study the effect of different formulations of Sulphr and Boron on yield of Corn.

Field Experiment Methodology

The field trials were carried out to see the effect of different formulations of Sulphur and Boron in different dosages of the active, including compositions as per the embodiment of the present invention, on the yield in commercially cultivated Corn field at Chandrala, Gandhinagar.

The trial was laid out during the Rabi season in Randomized Block Design (RBD) with four treatments including untreated control, replicated four times. For each treatments, plot size of 40 sq·m (8 m×5 m) was maintained. The treatments included different forms of Sulphur and Boron combinations in varying dosages of application, applied via basal application at the time of sowing of corn. Corn crop in trial field was raised followed good agricultural practice.

Details of Experiment
a) Trial Location: Chandrala, Gandhinagar (Guj)
b) Crop: Corn (var: GM 6)
c) Experiment season: Rabi 2018
d) Trial Design: Randomized Block Design
e) Replications: Four
f) Treatment: Four
g) Plot size: 8 m×5 m=40 sq·m
h) Date of transplanting: 6 Nov. 2018
i) Date of Application: 6 Nov. 2018
j) Method of application: Basal application
k) Date of Harvesting: 4 Apr. 2019

The observation on grain yield was recorded at the time of harvesting and mean data of all observations were presented in tables 6 to enumerate the impact the combination of sulphur and Boron on corn yield.

TABLE 7

To assess the effect of different formulation combination of Sulphur and Boron on yield of Corn

| Treatment details | Product Dose/acre (in kg or ml) | Dose of nutrient salt in g/acre | | Grain yield (q/acre) | % yield increase over untreated |
|---|---|---|---|---|---|
| | | S | B | | |
| T1-Untreated | — | — | — | 26.14 | — |
| T2-50% Sulphur + 25% Calcium borate (B-2.272%) WDG | 4 | 2000 | 90.8 | 33.43 | 27.9 |
| T3- 25% Sulphur + 12.5% Calcium borate (B-1.136%) SC | 8 | 2000 | 90.8 | 32.67 | 25.0 |
| T4- Bentonite Sulphur and Boron -Pastilles | 10 | 9000 | 200 | 30.99 | 18.6 |
| CD at 0.05% | — | — | — | 2.03 | — |

It was observed from the above table that Treatment 2 with 50% Sulphur+25% Calcium borate (B-2.272%) water dispersible granules and Treatment 3 with 25% Sulphur+12.5% Calcium borate (B-1.136%) suspension concentrate, both as per the embodiments of the present invention, showed a significant enhancement in the grain yield of corn over the untreated control as compared to treatment T4 with Pastille composition of Bentonite Sulphur with Boron. In fact, Treatments 2 and 3 with compositions as per the present invention, showed 27.9% and 25% increase respectively, in the grain yield in corn over the untreated control whereas treatment T4 only showed an 18.6% increase, in the grain yield over the untreated control. The results with the treatments T2 and T3 as per the present invention are all the more surprising, as they are applied at significantly reduced dosages as compared to treatments T4 applied at very high dosages of application.

Further, the inventors of present invention also tested the combination of elemental sulphur and boron salts with fertilizer or other micronutrients on certain crops like tomato and grapes. It was observed that addition of other micronutrients such as manganese or zinc salts, to the combination of the present invention may further enhance crop characteristics like greenness, fruit weight, plant height and add to nutritional value of the crop. Further such combinations may additionally help in improving the crop yield, improved photosynthesis, increase chlorophyll content and uptake of other nutrients by the crop.

Thus, it has been observed that the composition of the present invention, demonstrates enhanced, efficacious and superior behavior in the fields. The advantages exhibited by the compositions according to the invention, include but are not limited to improved stability, improved toxicological behavior, improved physiological parameters of the crop such as enhanced root system, increased plant height, bigger leaf blade, less dead basal leaves, stronger tillers, greener leaf color, increased tillering and shoot growth, improved plant vigor, earlier flowering, more productive tillers as well as an enhanced disease control. The plants also exhibited improved chlorophyll content of the leaves, and characteristics such as improved nutrient content, protein content, photosynthetic activity, early seed germination, early grain maturity, improved quality of the produce, improved fortification of the plant, conditioning the soil along with an improvement in the crop yield. Also, the compositions of the inventions are suitable for drip irrigation or sprinkler irrigation, in addition to other methods of applications of the agricultural compositions, in which most of the commercial products fail.

Through the composition of the present invention, the number of applications or the amount of nutrients, fertilizers or pesticides are minimized. The composition is highly safe to the user and to the environment.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

We claim:

1. A liquid suspension composition for crop nutrition and fortification,
    wherein the liquid composition comprises:
    elemental sulphur in the range of from 1%-65% by weight of the total composition;
    at least one boron salt, its complexes, derivatives or mixtures thereof in the concentration of from 0.1%-55% by weight of the total composition;
    at least one agrochemically acceptable excipient; and,
    at least one structuring agent in the range of from 0.01%-5% by weight of the total composition,
    wherein the composition comprises particles in the size range of from 0.1 micron to 20 microns.

2. The composition as claimed in claim 1, wherein the boron salt comprises water insoluble boron salts, complexes, derivatives or mixtures thereof.

3. The composition as claimed in claim 2, wherein the water insoluble boron salt comprises calcium borate or gertsley borate; zinc borate; magnesium borate or boracite; aluminium borate; boron phosphate; boron trioxide, complexes, derivatives, or mixtures thereof.

4. The composition as claimed in claim 1, wherein the boron salt, comprises a water soluble boron salt selected from boric acid or orthoboric acid or boracic acid or acidum boricum; borax or sodium borate or sodium tetraborate; sodium borosilicate; sodium tetraborate decahydrate; disodium tetraborate; potassium tetraborate; boron trichloride or Boron(III) chloride or Trichloroborane; boron triiodide or triiodoborane; boron sesquioxide or boric acid anhydride; disodium octaborate tetrahydrate or Aquabor/Boron sodium oxide or Sodium octaborate or Tim-bor insecticide or Polybor; Borax pentahydrate or Bor48 or 5 Mol Borax; boron oxide or boron suboxide or boron monoxide; boron hydroxide, Sodium-Calcium Borates; Boron trifluoride; boric oxide; disodium octaborate; sodium borohydride or sodium tetrahydridoborate or sodium tetrahydroborate; sodium cyanoborohydride; sodium triacetoxyborohydride or sodium triacetoxyhydroborate; sodium triethylborohydride; complexes, derivatives or mixtures thereof.

5. The composition as claimed in claim 4, wherein the water soluble boron salt comprise boric acid; borax or sodium borate or sodium tetraborate or sodium tetraborate decahydrate or sodium tetraborate pentahydrate; sodium borosilicate; boron trioxide; disodium octaborate tetrahydrate, complexes, derivatives or mixtures thereof.

6. The composition as claimed in the claim 1, wherein the composition further comprises at least one additional active ingredient selected from one or more micronutrients, macronutrients, biostimulants, pesticidal actives or fertilizers selected from nitrogen fertilizers, phosphorous fertilizers, potassium fertilizers and salts, complexes, derivatives or mixtures thereof.

7. The composition as claimed in the claim 6, wherein the micronutrients, their salts, complexes, derivatives or mixtures thereof are present in the range of 0.1% to 70% by weight of the total composition.

8. The composition as claimed in the claim 1, wherein the boron salt comprises water soluble and/or water insoluble boron salts, complexes, derivatives or mixtures thereof.

9. The composition as claimed in claim 1, wherein the boron salt comprise one or more of boric acid; calcium borate; zinc borate; magnesium borate; boron trioxide; borax or sodium borate or sodium tetraborate or sodium tetraborate decahydrate or sodium tetraborate pentahydrate; boron oxide; disodium octaborate tetrahydrate, complexes, derivatives or mixtures thereof.

10. The liquid suspension composition as claimed in claim 1, wherein the weight ratio of the at least one boron salts, complexes, derivatives or mixtures thereof to elemental Sulphur is 1: 600 to 55:1.

11. The liquid suspension composition as claimed in claim 1, wherein the weight ratio of the at least one boron salts, complexes, derivatives or mixtures thereof to elemental Sulphur is 1: 50 to 35:1.

12. The liquid suspension composition as claimed in claim 1, wherein the liquid composition comprises elemental sulphur in the concentration range of from 1%-60% by weight of the total composition.

13. The liquid composition as claimed in claim 1, wherein the viscosity of the composition is in the range of 10 cps to 1200 cps.

14. The liquid composition as claimed in claim 1, wherein the viscosity of the composition is in the range of 10 cps to 500 cps.

15. The liquid composition as claimed in claim 1, wherein the structuring agent comprises one or more thickeners, viscosity modifiers, tackifiers, suspension aids, rheology modifiers or anti-settling agents.

16. The liquid suspension composition as claimed in claim 1, where the composition further comprises one or more agrochemically acceptable excipients selected from surfactants, dispersing agents, wetting agents, water miscible solvents, humectants, spreading agents, penetrating agents, sticking agents, drift reducing agents, ultraviolet absorbents, UV ray scattering agents, preservatives, stabilizers, buffers or pH adjusters or neutralizing agents, antifreezing agents or freeze point depressants, antifoaming agents or anticaking agents.

17. The composition as claimed in claim 1, wherein the suspensibility of the composition is at least 30%.

18. A process of preparation of the liquid suspension crop nutrition and fortification composition as claimed in claim 1, wherein the process comprises: milling a blend of elemental sulphur in the range of from 1%-65% by weight of the total composition, at least one boron salt, its complexes, derivatives or mixtures thereof in the concentration of from 0.1%-55% by weight of the total composition, at least one structuring agent in the range of from 0.01%-5% by weight of the total composition and at least one agrochemically acceptable excipient to obtain a slurry or wet mix with a particle size range of 0.1 micron to 20 microns.

19. A method of improving plant health or yield, the method comprising treating at least one of a plant, a plant propagation material, locus or parts thereof, a seed, seedling or surrounding soil with the crop nutrition and fortification composition as claimed in claim 1.

20. A water dispersible granular composition for crop nutrition and fortification composition, wherein the composition comprises:
   elemental sulphur in the range of from 1%-90% by weight of the total composition;
   at least one boron salt, its complexes, derivatives or mixtures thereof in the range of from 0.1%-70% by weight of the total composition; and,
   at least one dispersing agent present in the range of from 1%-30% w/w of the total composition;
   wherein the granules of the composition are in the range of from 0.1-2.5 mm and comprises particles in the size range of from 0.1 micron to 20 microns.

21. The water dispersible granular composition as claimed in claim 20, wherein the granules of the composition are in a size range of 0.1 mm to 1.5 mm.

22. The water dispersible granular composition as claimed in claim 20, wherein the granules of the composition comprise particles in the size range of 0.1 to 10 microns.

23. The water dispersible granular composition as claimed in claim 20, wherein the weight ratio of the at least one boron salts, complexes, derivatives or mixtures thereof to elemental Sulphur is 1: 90 to 70:1.

24. The water dispersible granular composition as claimed in claim 20, wherein the composition further comprises one or more agrochemically acceptable excipients selected from disintegrating agents, wetting agents, binders or fillers or carriers or diluents, buffers or pH adjusters or neutralizing agents, antifoaming agents, drift reducing agents, anticaking agents, spreading agents, penetrating agents, sticking agents or mixtures thereof.

25. The water dispersible granular composition as claimed in claim 20, wherein the composition has a dispersibility of at least 40%.

26. A process of preparation of the water dispersible granular composition for crop nutrition and fortification as claimed in claim 20, wherein the process comprises:
   a. milling a blend of elemental sulphur in the range of from 1%-90% by weight of the total composition, at least one boron salt, its complexes, derivatives or mixtures thereof in the range of from 0.1%-70% by weight of the total composition and at least one dispersing agent in the range of from 1%-30% w/w of the total composition to obtain a slurry or wet mix; and, b. drying the wet mix to obtain the water dispersible granular composition as claimed in claim 2, with a particle size of 0.1 micron to 20 microns.

27. The process of claim 26, wherein the milling step further comprises including at least one further agrochemically acceptable excipient selected from disintegrating agents, wetting agents, binders or fillers or carriers or diluents, buffers or pH adjusters or neutralizing agents, antifoaming agents, drift reducing agents, anticaking agents, spreading agents, penetrating agents, or sticking agents.

* * * * *